(12) United States Patent
Louis et al.

(10) Patent No.: US 11,708,457 B2
(45) Date of Patent: Jul. 25, 2023

(54) POLYARYLETHER KETONE COPOLYMER

(71) Applicant: SOLVAY SPECIALTY POLYMERS USA, LLC, Alpharetta, GA (US)

(72) Inventors: Chantal Louis, Alpharetta, GA (US); David B. Thomas, Atlanta, GA (US); Mohammad Jamal El-Hibri, Atlanta, GA (US); Ryan Hammonds, Atlanta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 1054 days.

(21) Appl. No.: 16/348,224

(22) PCT Filed: Oct. 24, 2017

(86) PCT No.: PCT/EP2017/077131
§ 371 (c)(1),
(2) Date: May 8, 2019

(87) PCT Pub. No.: WO2018/086873
PCT Pub. Date: May 17, 2018

(65) Prior Publication Data

US 2019/0322804 A1 Oct. 24, 2019

Related U.S. Application Data

(60) Provisional application No. 62/420,751, filed on Nov. 11, 2016.

(30) Foreign Application Priority Data

Apr. 3, 2017 (EP) ..................................... 17164457

(51) Int. Cl.
*C08G 65/40* (2006.01)
*C08K 3/013* (2018.01)
*C08K 7/14* (2006.01)

(52) U.S. Cl.
CPC .......... *C08G 65/4012* (2013.01); *C08K 3/013* (2018.01); *C08G 2650/40* (2013.01); *C08K 7/14* (2013.01)

(58) Field of Classification Search
None
See application file for complete search history.

(56) References Cited

U.S. PATENT DOCUMENTS 4,766,197 A 8/1988 Clendinning et al.
5,662,170 A 9/1997 Donovan et al.
(Continued)

FOREIGN PATENT DOCUMENTS

EP 0184458 A2 6/1986
EP 0225750 A2 6/1987
(Continued)

OTHER PUBLICATIONS

Standard ASTM D 3835-02, "Standard Test Method for Determination of Properties of Polymeric Materials by Means of a Capillary Rheometer", 2002, p. 1-11.
(Continued)

*Primary Examiner* — Megan McCulley
(74) *Attorney, Agent, or Firm* — Osha Bergman Watanabe & Burton LLP

(57) ABSTRACT

The invention pertains to certain copolymers (PEDEK/PEEK), comprising a majority of "PEDEK"-type recurring units, which, thanks to the predominance of PEDEK-type units, their structural homogeneity and regularity, and absence of chlorinated end groups, possess a suitable molecular structure and crystallization behaviour so as to deliver improved mechanical properties and outstanding chemical resistance, and which are useful in numerous fields
(Continued)

of endeavours, including notably in the oil&gas industry, and more specifically for the manufacture of parts used in oil and gas extraction systems.

17 Claims, 2 Drawing Sheets

(56) References Cited

U.S. PATENT DOCUMENTS

| | | | |
|---|---|---|---|
| 6,085,799 | A | 7/2000 | Kodaissi et al. |
| 6,123,114 | A | 9/2000 | Seguin et al. |
| 6,655,456 | B1 | 12/2003 | Yokley et al. |
| 6,863,124 | B2 | 3/2005 | Araux et al. |
| 7,874,356 | B2 | 1/2011 | Corre et al. |
| 9,133,111 | B2 | 9/2015 | Louis et al. |
| 9,175,136 | B2 | 11/2015 | Louis et al. |
| 2010/0239441 | A1 | 9/2010 | Bade et al. |
| 2011/0213115 | A1 | 9/2011 | Louis |
| 2011/0224399 | A1* | 9/2011 | Louis ............... C08G 16/00 528/125 |
| 2012/0234603 | A1 | 9/2012 | Vail |

FOREIGN PATENT DOCUMENTS

| | | |
|---|---|---|
| WO | 2001061232 A1 | 8/2001 |
| WO | 2009021918 A1 | 2/2009 |
| WO | 2010112435 A1 | 10/2010 |
| WO | 2015001327 A1 | 1/2015 |
| WO | 2015091588 A1 | 6/2015 |
| WO | 2016016643 A1 | 2/2016 |
| WO | 2016042492 A2 | 3/2016 |
| WO | 2016092087 A1 | 6/2016 |
| WO | 2016156825 A1 | 10/2016 |

OTHER PUBLICATIONS

Standard ASTM D 2857-07, "Standard Practice for Dilute Solution Viscosity of Polymers", 2007, p. 1-6.

Murphy J., in "Additives for Plastics Handbook", 2nd Edition, 2001, Chapter 5.2.3., p. 43-48—Elsevier Advanced Technology.

Bennett G. S. et al., "The synthesis and characterization of novel thermotropic liquid crystalline poly(aryl ether ketone)s", Polymer Engineering and Science, 1994, vol. 34 n°10, p. 781-793, Brookfield Center.

Zhang W.J. et al., "Syntheses and Properties of High Performance Poly(Aryl Ether Ether Ketone) Copolymers (I)-Copolycondensatlon of Hydroquinone, 4,4'-Diphenol and 4,4'-Difluorobenzophenone," Chemical Journal of Chinese Universities, vol. 14, Issue (5), pp. 738-740, 1993 (8 pages).

Office Action issued in corresponding Japanese Application No. 2019-524371; dated Aug. 17, 2021 (8 pages).

* cited by examiner

POLYARYLETHER KETONE COPOLYMER

CROSS-REFERENCE TO RELATED APPLICATIONS

This application claims priority to U.S. Provisional Application No. 62/420,751 filed Nov. 11, 2016, and European Application No. EP 17164457.8, filed Apr. 3, 2017, which are incorporated herein by reference in their entireties.

TECHNICAL FIELD

This invention pertains to novel polyarylether ketone copolymers having improved thermal and chemical resistance, to a method of making the same, and to the use thereof in oil and gas exploration and extraction.

BACKGROUND ART

Polyaryl ether ketone materials are known as high performance plastics with high thermal resistance, which are used for a number of industrial applications where resistance to extreme conditions is required.

In particular, oil&gas exploration requires materials able to resist high temperature and pressure, and capable of maintaining the required performances upon prolonged exposure in the said extreme pressure and temperature conditions to aggressive chemicals present in downhole environment, including notably salt water, hydrocarbons, $CO_2$, $H_2S$, etc.

In this area, hence polyether ether ketone (PEEK), having characterizing recurring unit of formula —O-Ph-O-Ph-CO-Ph-, with Ph=para-phenylene, has found broad utility, thanks to its crystalline melting point of about 335° C. enabling acceptable processing, although its glass transition temperature of about 148° C. is somewhat limiting its ability to withstand continuous operations at temperatures of 150° C. or beyond.

On the other side, polyaryl ether ketones (PAEKs) have been proposed, targeting increased glass transition temperatures, such as PEK (having characterizing recurring unit of formula —O-Ph-CO-Ph-), PEKK (having characterizing recurring unit of formula —O-Ph-CO-Ph-CO-Ph), and PEKEKK (having characterizing recurring unit of formula —O-Ph-CO-Ph-O-Ph-CO-Ph-CO-Ph). All these PAEKs, while possessing increased Tg, are nevertheless known as more sensitive to chemicals in aggressive environments, e.g. they possess lower steam resistance, and may suffer from excessively high melting temperatures, associated hence to processing hurdles.

In this area, copolymers comprising a mixture of units —O-Ph-O-Ph-CO-Ph- (I) and —O-Ph-Ph-O-Ph-CO-Ph- (II) have been proposed, as an attempt to provide materials possessing increased Tg over PEEK, but yet similar or even lower crystalline melting point.

Notably, EP 0184458 A (ICI PLC) Jun. 11, 1986 is directed to aromatic polyetherketones containing the repeat units: —O-Ph-O-Ph-CO-Ph- (I) and —O-Ph-Ph-O-Ph-CO-Ph- (II) in the relative molar proportions 1:11 of 95:5 to 60:40, preferably 90:10 to 60:40, which are disclosed as possessing similar properties as known PAEKs materials (e.g. PEK or PEEK), but enabling processing at lower temperature. A copolymer having molar proportions 1:11 of 50/50 was disclosed as a non-working embodiment, failing to perform adequately to the aim pursued therein.

Similarly, EP 0225750 A (ICI PLC) Jun. 16, 1987 pertains to fibrous reinforced compositions including a polyetherketone containing the repeat units: —O-Ph-O-Ph-CO-Ph- (I) and —O-Ph-Ph-O-Ph-CO-Ph- (II) in the relative molar proportions 1:11 of 95:5 to 60:40, preferably 95:5 to 70:30; impact properties of composite laminates processed from the melt were shown to be sensitive to the cooling conditions.

Yet, WO 2016/016643 (VICTREX MANUFACTURING LIMITED) Feb. 4, 2016 discloses a polymeric material possessing mechanical and chemical resistance, notably high fracture toughness and high crystallinity, obtained by blending (A) a polyetherketone containing the repeat units: —O-Ph-O-Ph-CO-Ph- (I) and —O-Ph-Ph-O-Ph-CO-Ph- (II) in the relative molar proportions 1:11 of 95:5 to 50:50, preferably 95:5 to 60:40, more preferably 95:5 to 65:35; and possessing a melting point of less than 330° C.; with (B) a polyarylether ketone material which can be notably PEEK or PEK.

Still, WO 2016/042492 (GHARDA CHEMICALS LIMITED) Mar. 24, 2016 discloses notably certain polyarylether ketones manufactured from 4,4'-difluorobenzophenone and a mixture of biphenol and hydroquinone, in molar ratios 95:5 to 5:95, as well as copolymers of PEK and PEDEK, including units of formula -Ph-CO-Ph-O— and units of formula -Ph-Ph-O-Ph-CO-Ph-O—, in variable molar ratios, as random or block copolymers. Only these latter copolymers are actually exemplified, possessing properties similar to PEK, i.e. affected by an unfavourable ketone/ether molar ratio.

As a whole, hence, in the past, copolymers containing a majority of repeat units —O-Ph-O-Ph-CO-Ph- (I) and a minority of units —O-Ph-Ph-O-Ph-CO-Ph- (II) were generally dwelt on, and recommended for use either alone or in admixture with other PAEKs.

An isolated disclosure of a copolymer —O-Ph-O-Ph-CO-Ph- (I) and —O-Ph-Ph-O-Ph-CO-Ph- (II) with a molar ratio 1:11 of 25:75 can be nevertheless found in U.S. Pat. No. 4,766,197 (AMOCO CORPORATION) Aug. 23, 1988. This document describes in its example 3 a copolymer, as above detailed, which is manufactured through nucleophilic polycondensation reacting 4,4'-difluorobenzophenone, hydroquinone and biphenol in the presence of a mixture of sodium and potassium carbonate (Na/K~20 mol/mol), the entire amount of which was added at the beginning of the reaction, and termination by end-capping with 4,4'-dichlorodiphenylsulfone. Further investigation carried out by the Applicant have shown that this manufacturing method, including use of carbonates at Na/K ratio of about 20, i.e. including a significant amount of more reactive $K_2CO_3$, and termination through the addition of a spurious dichlorinated monomer, is such to increase probability of side reactions and generate end groups having organic chlorine bound, all structural parameters detrimentally affecting crystallization ability of the resulting polymer. Indeed, reaction chemistry and/or modifying additives have been found to significantly affect regularity of the obtained polymer structure, so that its mechanical performance were found to be poor.

There is hence a continuous quest in the art for polyaryl ether ketone polymers possessing an advantageous combination of thermal rating/thermal performances and chemical resistance, while maintaining outstanding mechanical performances, so as to provide materials suitable for being used in extremely demanding application, such as notably oil and gas exploration and extraction.

SUMMARY OF INVENTION

It is hence a first object of the present invention a polyaryl ether ketone copolymer [copolymer (PEDEK-PEEK)] comprising:

recurring units ($R_{PEEK}$) of formula (I):

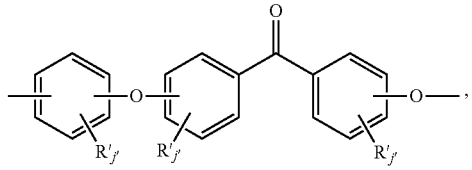

Formula (I)

and recurring units ($R_{PEDEK}$) of formula (II):

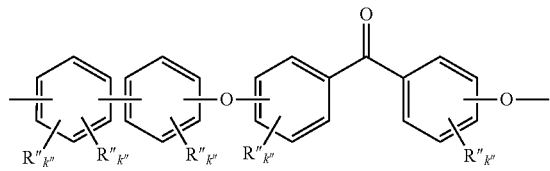

Formula (II)

wherein in above formulae (I) and (II), each of R' and R", equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of j' and k", equal to or different from each other, is independently selected at each occurrence from 0 and an integer of 1 to 4;

wherein the said recurring units are comprised in a molar ratio ($R_{PEEK}$):($R_{PEDEK}$) of 45:55 to 15:85, and wherein the said copolymer (PEDEK/PEEK):

(j) comprises an amount of chemically bound chlorine of less than 2.0 µeq/g, as determined by microcoulometry, and (jj) possesses a narrow molecular weight distribution such that the following inequality is satisfied:

$$MV\left(\frac{kN}{m^2}\right) \leq 6.62 \cdot \left[RV\left(\frac{dl}{g}\right)\right]^{0.20}$$ Math. 1 wherein:

MV is the melt viscosity measured pursuant to ASTM D3835 standard at 410° C. and at a shear rate of 46.3 sec$^{-1}$, using a conical die having a diameter of 1.016 mm a length of 20.32 mm and a cone angle of 120° C. and expressed in kNs/m$^2$; and RV is the reduced viscosity measured pursuant to ASTM D2857 standard at 25° C. on 1.0 wt/vol % solution in concentrated $H_2SO_4$ (96 wt %) and expressed in dl/g.

Another object of the present invention is a method of making a copolymer (PEDEK/PEEK), as above detailed, comprising reacting at least one difluoro-derivative of formula (III):

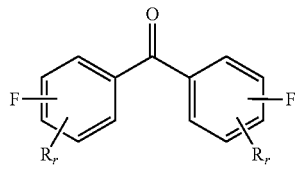

Formula (III)

with a mixture of di-hydroxyderivatives of formulae (IV) and (V):

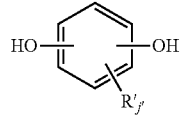

Formula (IV)

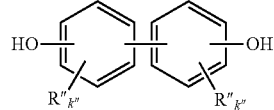

Formula (V)

in a molar ratio (IV):(V) of 45:55 to 15:85, wherein in above formulae (III), (IV) and (V), each of R, R' and R", equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of r, j' and k", equal to or different from each other, is independently selected at each occurrence from 0 and an integer of 1 to 4, in a polar organic solvent in the presence of a mixture of $Na_2CO_3$ and $K_2CO_3$, in a molar ratio Na/K of more than 45 mol/mol, and wherein the method possibly include adding a step of adding a chlorinated compound of formula (VI):

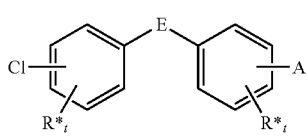

Formula (VI)

wherein -E-is a sulfone group of formula —$SO_2$— or a ketone group of formula —C(O)—, A is selected from Cl, F and H, each of R*, equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of t, equal to or different from each other, is independently selected at each occurrence from 0 and an integer of 1 to 4, with the proviso that if said chlorinated compound of formula (VI) is added, its amount is of no more than 1% moles with respect to the total molar amount of monomers of formula (III), (IV) and (V).

The invention further notably pertains to the a method of making parts included in devices used for oil & gas recovery, including moulding those parts from the copolymers (PEDEK/PEEK) as above detailed.

The Applicant has found that the method, as above detailed, is effective in delivering copolymers (PEDEK/PEEK), as above detailed, comprising a majority of "PEDEK"-type recurring units, which, thanks to the predominance of PEDEK-type units, their structural homogeneity and regularity, and absence of chlorinated end groups, possess a suitable molecular structure and crystallization behaviour so as to deliver improved mechanical properties and outstanding chemical resistance.

DESCRIPTION OF EMBODIMENTS

The Copolymer (PEDEK/PEEK)

Figure 1:
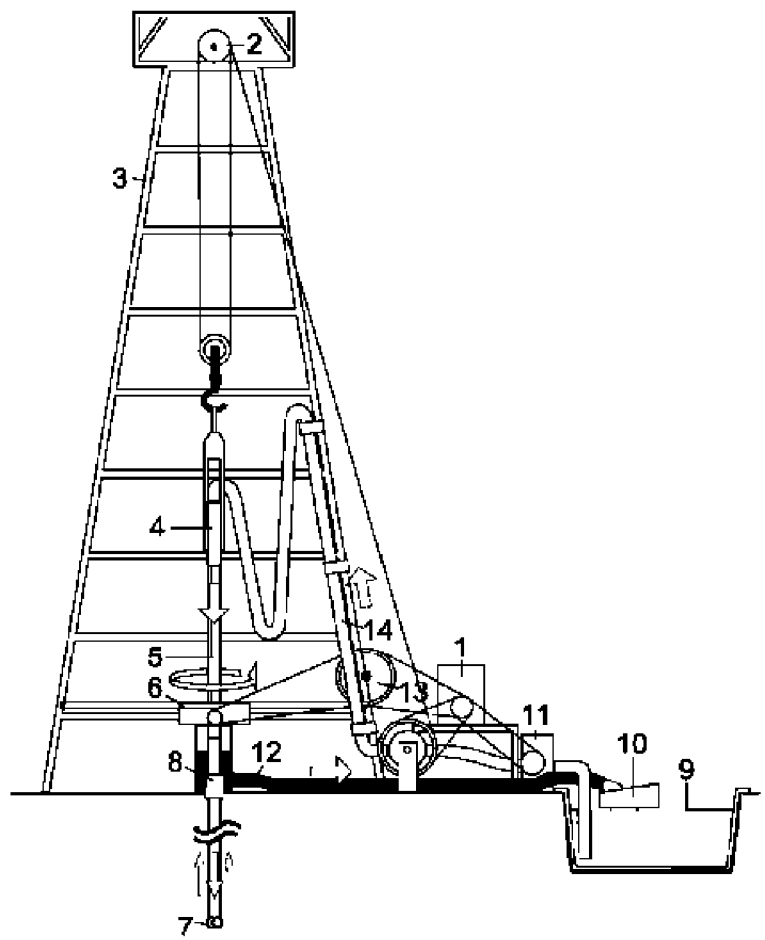
FIG. 1 schematically depicts a drilling rig equipment.

The copolymer (PEDEK/PEEK) comprises recurring units ($R_{PEEK}$) and ($R_{PEDEK}$) as above detailed in molar ratio ($R_{PEEK}$):($R_{PEDEK}$) of 45:55 to 15:85, preferably of 44:56 to 16:84, more preferably of 43:57 to 17:83, and even more preferably of 42:58 to 18:82. Copolymers (PEDEK/PEEK) which have been found particularly advantageous are those comprising recurring units ($R_{PEEK}$) and ($R_{PEDEK}$) as above detailed in molar ratio of 40:60 to 20:80.

The copolymer (PEDEK/PEEK) of the present invention may additionally comprise recurring units ($R_{PAEK}$) different from recurring units ($R_{PEEK}$) and ($R_{PEDEK}$), as above detailed. In such case, the amount of recurring units ($R_{PAEK}$) is generally comprised between 0 and 5% moles, with respect to the total number of moles of recurring units of copolymer (PEDEK/PEEK), while recurring units ($R_{PEEK}$) and ($R_{PEDEK}$) will be present in an amount of at least 95% moles, with respect to the total number of moles of recurring units of copolymer (PEDEK/PEEK).

When recurring units ($R_{PAEK}$) different from recurring units ($R_{PEEK}$) and ($R_{PEDEK}$) are present in the copolymer (PEDEK/PEEK) of the present invention, these recurring units ($R_{PAEK}$) generally comply with any of the following formulae (K-A) to (K-M) herein below:

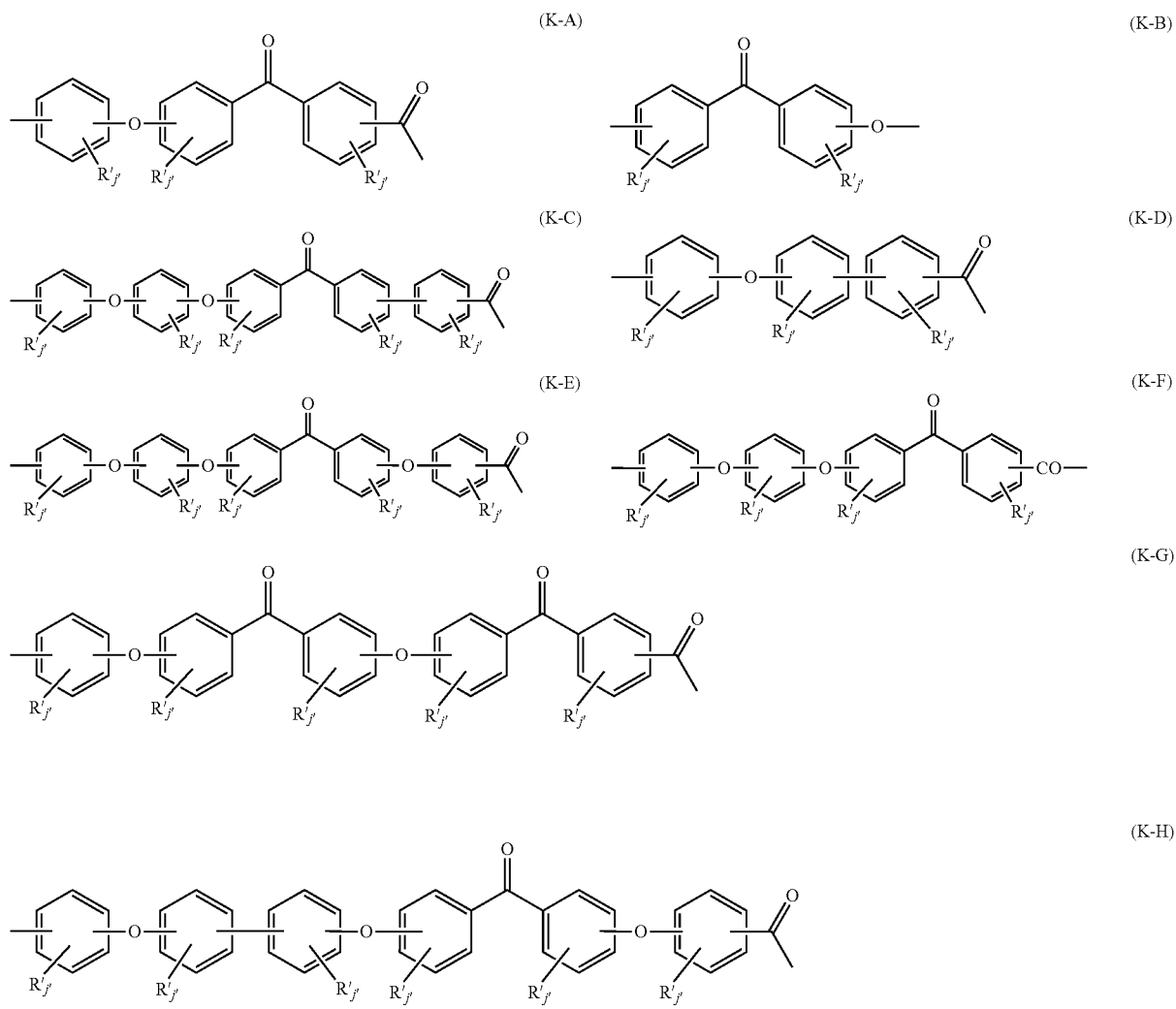

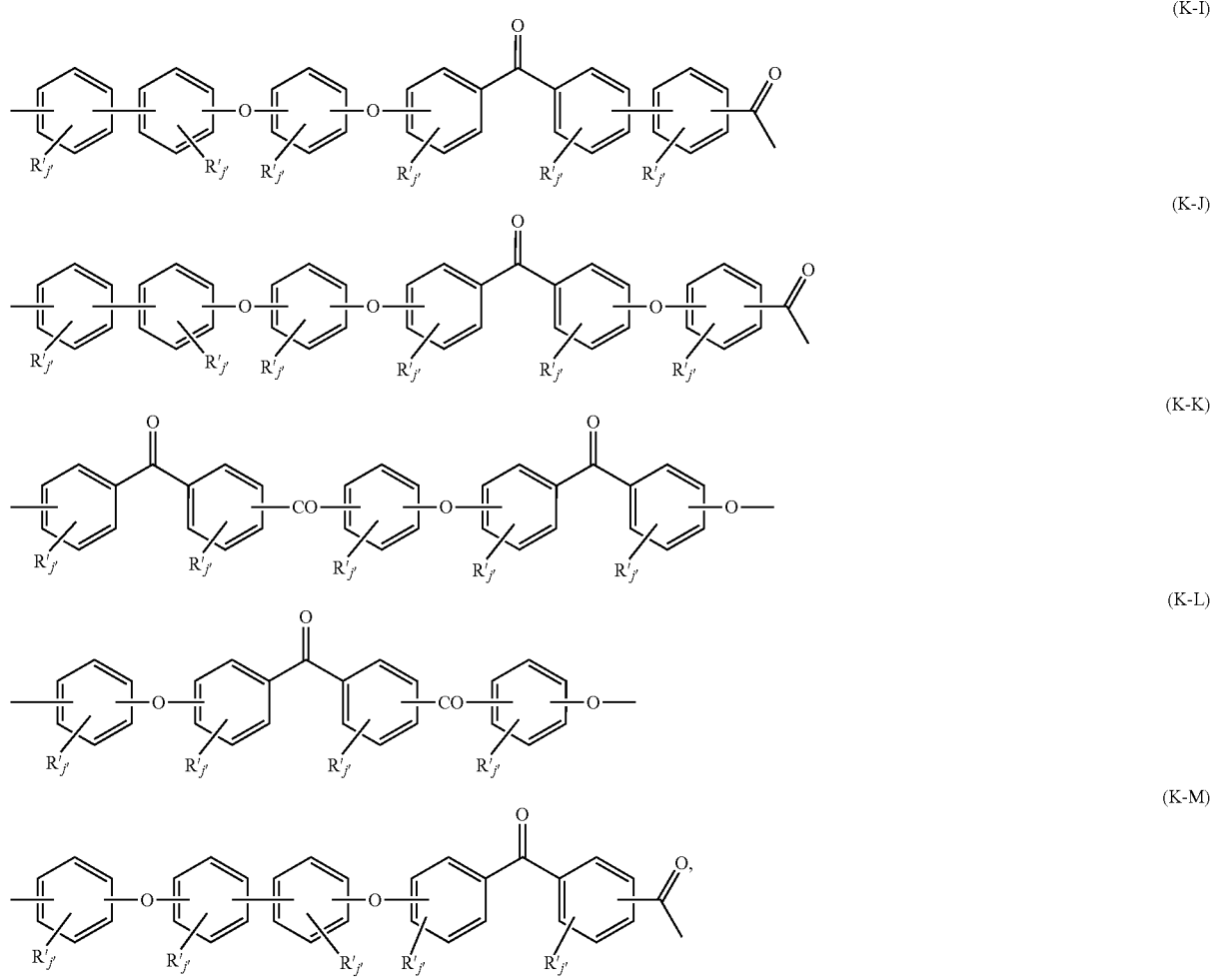

wherein in each of formulae (K-A) to (K-M) above, each of R', equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4, preferably j' being equal to zero.

It is nevertheless generally preferred for the copolymer (PEDEK/PEEK) of the present invention to be essentially composed of recurring units ($R_{PEEK}$) and ($R_{PEDEK}$), as above detailed.

Defects, end groups and monomers' impurities may be incorporated in very minor amounts in the copolymer (PEDEK/PEEK) of the present invention, so as to advantageously not affecting negatively the performances of the same.

In recurring units ($R_{PEEK}$) of formula (I), the connections among phenyl groups are generally in the para positions of each of the phenyl rings. Further, it is generally preferred for each of j' to be zero, or in other words, for each of the phenyl rings not to bear any further substituents in addition to the catenary ethereal or ketone bridging groups. According to these preferred embodiments, recurring units ($R_{PEEK}$) comply with formula (Ia):

Formula (Ia)

Similarly, in recurring units ($R_{PEDEK}$) of formula (II), the connections among phenyl groups are generally in the para positions of each of the phenyl rings. Further, it is generally preferred for each of k" to be zero, or in other words, for each of the phenyl rings not to bear any further substituents in addition to the catenary ethereal or ketone bridging groups. According to these preferred embodiments, recurring units ($R_{PEDEK}$) comply with formula (IIb):

Formula (IIb)

As explained above, copolymer (PEDEK/PEEK) comprises an amount of chemically bound chlorine of less than 2.0 μeq/g, as determined by microcoulometry. In other terms, copolymer (PEDEK/PEEK) is substantially deprived of chlorinated end groups.

Indeed, it is essential for copolymer (PEDEK/PEEK) to comprise spurious chlorinated end groups, e.g. those derived from chlorine-containing monomers or end-capping agents in an amount such to provide for chemically bound chlorine in an amount of less than 2.0 μeq/g, preferably less than 1.9 μeq/g, preferably less than 1.8 μeq/g.

The Applicant has surprisingly found that the presence of such spurious end groups, in combination with a "disordered" structure, is such to significantly detrimentally affecting crystallization rate, so as to confer to the copolymer (PEDEK/PEEK) comprising the same lower thermal and chemical resistance.

It is hence understood that copolymer (PEDEK/PEEK) comprises a major amount of end groups selected from the group consisting of:

benzo-phenone fluoride groups of formula:

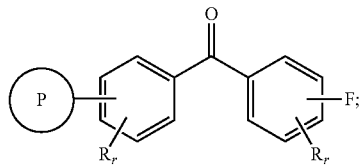

Formula (F)

hydroxyl-containing groups of formula (OH-1) or (OH-2) or salified groups thereof:

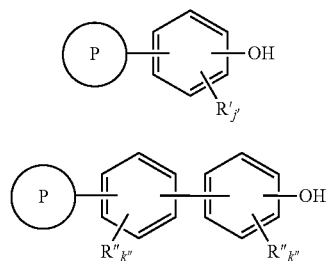

Formula (OH-1)

Formula (OH-2)

wherein in each of formulae (F), (OH-1) and (OH-2), R, R', R—, r, j' and k" have the meanings already defined above, and wherein the symbol

is intended to denote the polymer chain comprising recurring units ($R_{PEEK}$) and ($R_{PEDEK}$), as above detailed.

End groups of formulae (F), (OH-1) and (OH-2) preferably represent at more than 50% moles, preferably at least 60% moles, even more preferably at least 70% moles, still more preferably at least 80% moles, with respect to the total moles of end groups of the copolymer (PEDEK/PEEK).

Further, as explained above, the copolymer (PEDEK/PEEK) possesses a narrow molecular weight distribution such that the following inequality is satisfied:

$$MV\left(\frac{kN}{m^2}\right) \leq 6.62 \cdot \left[RV\left(\frac{dl}{g}\right)\right]^{0.20} \qquad \text{Math. 2}$$

wherein:

MV is the melt viscosity measured pursuant to ASTM D3835 standard at 410° C. and ata shear rate of 46.3 sec$^{-1}$, using a conical die having a diameter of 1.016 mm a length of 20.32 mm and a cone angle of 120° C. and expressed in kNs/m$^2$; and RV is the reduced viscosity measured pursuant to ASTM D2857 standard at 25° C. on 1.0 wt/vol % solution in concentrated H$_2$SO$_4$ (96 wt %) and expressed in dl/g.

Indeed, the Applicant has surprisingly found that when copolymers (PEDEK/PEEK) are such that:

$$MV\left(\frac{kN}{m^2}\right) > 6.62 \cdot \left[RV\left(\frac{dl}{g}\right)\right]^{0.20}, \qquad \text{Math. 3}$$

these copolymers (PEDEK/PEEK) are not found to possess the advantageous thermal and chemical stability otherwise achieved through tuning of recurring units ($R_{PEEK}$) and ($R_{PEDEK}$) molar ratio and absence of spurious (chlorinated) end-groups.

Generally, the copolymers (PEDEK/PEEK) are such to preferably satisfy the following inequality:

$$MV\left(\frac{kN}{m^2}\right) \leq 6.60\left[RV\left(\frac{dl}{g}\right)\right]^{0.20}, \qquad \text{Math. 4}$$

more preferably to satisfy the following inequality:

$$MV\left(\frac{kN}{m^2}\right) \leq 6.50\left[RV\left(\frac{dl}{g}\right)\right]^{0.20}, \qquad \text{Math. 5}$$

even more preferably to satisfy the following inequality:

$$MV\left(\frac{kN}{m^2}\right) \leq 6.40\left[RV\left(\frac{dl}{g}\right)\right]^{0.20}. \qquad \text{Math. 6}$$

The copolymer (PEDEK/PEEK) as above detailed possesses a reduced viscosity (RV) measured as above detailed, i.e. pursuant to ASTM D2857 standard at 25° C. on 1.0 wt/vol % solution in concentrated H$_2$SO$_4$ (96 wt %) and expressed in dl/g, of at least 0.2, preferably at least 0.7, more preferably at least 0.9 and/or at most 6.0, preferably at most 5.5, more preferably at most 5.0. Particularly good results were obtained with copolymers (PEDEK/PEEK) having RV of 0.9 to 5.0 dl/g.

Method of Making the Copolymer (PEDEK/PEEK)

Another object of the invention is a method of making a copolymer (PEDEK/PEEK), as above detailed, comprising reacting at least one difluoro-derivative of formula (III):

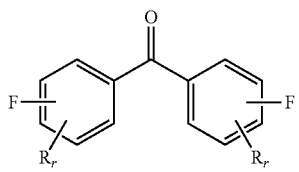

Formula (III)

with a mixture of di-hydroxyderivatives of formulae (IV) and (V):

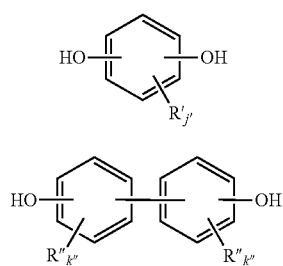

Formula (IV)

Formula (V)

in a molar ratio (IV):(V) of 45:55 to 15:85, wherein in above formulae (III), (IV) and (V), each of R, R' and R", equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of r, j' and k", equal to or different from each other, is independently selected at each occurrence from 0 and an integer of 1 to 4, in a polar organic solvent in the presence of a mixture of $Na_2CO_3$ and $K_2CO_3$, in a molar ratio Na/K of more than 45 mol/mol, and wherein the method possibly include adding a step of adding a chlorinated compound of formula (VI):

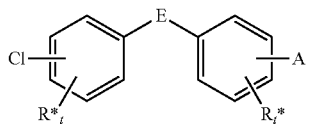

Formula (VI)

wherein -E- is a sulfone group of formula —$SO_2$— or a ketone group of formula —C(O)—, A is selected from Cl, F and H, each of R*, equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of t, equal to or different from each other, is independently selected at each occurrence from 0 and an integer of 1 to 4, with the proviso that if said chlorinated compound of formula (VI) is added, its amount is of no more than 1% moles with respect to the total molar amount of monomers of formula (III), (IV) and (V)

It is generally preferred for the method of the present invention that the reaction occurs in substantial absence of any chlorinated compound of formula (VII):

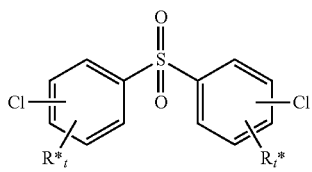

Formula (VII)

wherein each of R*, equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of t, equal to or different from each other, is independently selected at each occurrence from 0 and an integer of 1 to 4, wherein the said expression "substantial absence" is hereby intended to mean that if the said compound of formula (VII) is present, its amount is of less than 1% moles, preferably less than 0.8% moles, more preferably less than 0.5% moles, with respect to the total moles of monomers of formula (III), (IV) and (V), as above detailed.

The method of the invention may include reacting monomers of formula (III), (IV) and (V), as above detailed, in the presence of one or more compounds selected from compounds of formula (VIII):

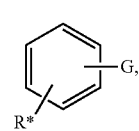

(VIII)

wherein G is OH or a group of formula:

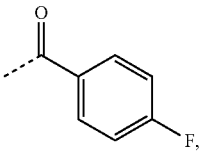

bound to the phenyl ring of compound (VIII) through the dotted bond, and wherein R* is H or is selected from a $C_1$-$C_{12}$ group optionally comprising one or more than one heteroatoms; sulfonic acid and sulfonate groups; phosphonic acid and phosphonate groups; amine and quaternary ammonium groups.

When a compound of formula (VIII) as above detailed is used, it is generally employed in an amount of at most 1.00% moles, with respect to the total molar amounts of monomers of formula (III), (IV) and (V), as above detailed. According to these embodiment's, method may include adding required amount of compound (VIII) at the beginning of the reaction, and/or may include adding a portion or all the required amount of compound (VIII) at a later stage, after monomers of formula (III), (IV) and (V) have reacted for a certain time, and terminate the reaction after this addition.

The Applicant has advantageously found that maintaining a high Na/K ratio of more than 45 mol/mol, in combination with limiting or avoiding introduction of chlorinated compounds of formula (VI), as above detailed, is necessary for achieving the copolymers (PEDEK/PEEK) as above detailed, possessing an advantageous low content of organic chlorine and narrow molecular weight distribution, as evident from the above detailed inequality:

$$MV\left(\frac{kN}{m^2}\right) \leq 6.62 \cdot \left[RV\left(\frac{dl}{g}\right)\right]^{0.20} \qquad \text{Math. 7}$$

is satisfied.

In the method of the invention, $Na_2CO_3$ and $K_2CO_3$ are used in an amount such that the ratio between the total amount in moles of said $Na_2CO_3$ and $K_2CO_3$ and the total amount in moles of hydroxyl-monomers of formulae (IV) and (V), as above detailed, i.e. the molar ratio:

$$\frac{n_{Na_2CO_3} + n_{K_2CO_3}}{n_{(IV)} + n_{(V)}} \qquad \text{Math. 8}$$

is of advantageously at least 0.95, preferably at least 0.99, more preferably at least 1.00 mol/mol and/or advantageously at most 1.20, preferably at most 1.10, more preferably at most 1.06 mol/mol.

Generally, the $Na_2CO_3$ used in the method of the invention meets the particle size distribution requirements as detailed in U.S. Pat. No. 9,175,136 (SOLVAY ADVANCED POLYMERS LLC) Sep. 1, 2011.

Preferred monomer (III) is 4,4'-difluorobenzophenone (DFBP). It is generally preferred to make use of DFBP comprising low amounts of certain impurities, as detailed in US 2011213115 (SOLVAY ADVANCED POLYMERS LLC) Sep. 1, 2011.

In the method of the present invention, monomers (III), (IV) and (V) are reacted in such an amount that the ratio between the molar amount of difluoro-monomer of formula (III) and the total molar amount of hydroxyl-monomers of formulae (IV) and (V), i.e. the molar ratio:

$$\frac{n_{difluoro-monomer(III)}}{n_{hydroxy-monomer(IV)} + n_{hydroxyl-monomer(V)}} \qquad \text{Math. 9}$$

is of at least 0.95, preferably at least 0.99 mol/mol and/or of at most 1.05, preferably at most 1.03 mol/mol.

Preferred monomer (IV) is hydroquinone and preferred monomer (V) is 4,4'-dihydroxybiphenyl, otherwise known as 4,4'-biphenol.

Polar organic solvents possessing suitable solubilisation ability with respect to the cited monomers, and suitable thermal resistance at the polycondensation temperatures can be used. Preference is given to high boiling aprotic polar solvents; diphenysulfone is a preferred solvent, and is generally used in the method of the present invention as solvent comprising limited amounts of impurities, as detailed in U.S. Pat. No. 9,133,111 (SOLVAY ADVANCED POLYMERS LLC) Aug. 7, 2014.

It is also preferable that the monomers (III), (IV) and (V) are heated in the method of the invention at a first temperature of at least 120° C., preferably at least 130° C., more preferably at least 140° C. before being contacted with the mixture of $Na_2CO_3$ and $K_2CO_3$. According to this embodiment, the addition of the mixture of $Na_2CO_3$ and $K_2CO_3$ is done stepwise (i.e. through multiple sequential discontinuous additions) or continuously in time, e.g. through appropriate feeding systems, at a rate such that the required amount is delivered step-wise/continuously during a time period of at least 15 minutes, preferably at least 20 minutes, more preferable at least 30 minutes and/or in a manner that the addition rate is of less than 40% of total amount/minute, preferably of less than 30% of total amount/minute, more preferably of less than 20% of total amount/minute, and/or is of more than 3% of total amount/minute, preferably of more than 5% of total amount/minute.

After completing addition of the mixture of $Na_2CO_3$ and $K_2CO_3$, the reaction is generally pursued by heating the resulting mixture at a temperature of at least 300° C., preferably at least 320° C., at a temperature ramp rate of less than 5° C./minute, preferably less than 3° C./minute and/or at a temperature ramp rate of more than 0.5° C./minute.

Once achieved the final target temperature, the reaction is generally pursued for a limited period at time at this temperature, before interrupting the reaction. The polycondensation reaction is advantageously terminated by adding an additional amount of monomer (III), such that the molar ratio $$\frac{n_{difluoro-monomer(III)}}{n_{hydroxy-monomer(IV)} + n_{hydroxyl-monomer(V)}} \qquad \text{Math. 10}$$

as above detailed is brought in the range of 1.01 to 1.15 mol/mol, preferably in the range of 1.03 to 1.10 mol/mol.

Composition Comprising the Copolymer (PEDEK/PEEK)

The invention further pertains to a composition (C) comprising at least one copolymer (PEDEK/PEEK).

The composition (C) may comprise copolymer (PEDEK/PEEK), as above detailed, in a weight amount of at least 10%, at least 30%, at least 40% or at least 50%, based on the total weight of the of the said composition (C). According to certain preferred embodiment's, the composition (C) comprises copolymer (PEDEK/PEEK), as above detailed, in a weight amount of at least 70%, based on the total weight of the said composition (C). According to other embodiment's, the composition (C) comprises the copolymer (PEDEK/PEEK), as above detailed, in a weight amount of at least 90%, if not at least 95%, based on the total weight of the said composition (C). Yet, embodiment's are provided wherein the composition (C) consists essentially of the copolymer (PEDEK/PEEK), as above detailed. For the purpose of the present invention, the expression "consisting essentially of" is to be understood to mean that any additional component different from the copolymer (PEDEK/PEEK), as above detailed, is present in an amount of at most 1% by weight, based on the total weight of the composition (C), so as not to substantially alter advantageous properties of the composition.

The composition (C) may further comprise at least one reinforcing filler. Reinforcing fillers are well known by the skilled in the art. They are preferably selected from fibrous and particulate fillers different from the pigment as defined above. More preferably, the reinforcing filler is selected from mineral fillers (such as talc, mica, kaolin, calcium carbonate, calcium silicate, magnesium carbonate), glass fiber, carbon fibers, synthetic polymeric fiber, aramid fiber, aluminum fiber, titanium fiber, magnesium fiber, boron carbide fibers, rock wool fiber, steel fiber, wollastonite etc. Still more preferably, it is selected from mica, kaolin, calcium silicate, magnesium carbonate, glass fiber, carbon fibers and wollastonite etc.

Preferably, the filler is chosen from fibrous fillers. A particular class of fibrous fillers consists of whiskers, i.e.

single crystal fibers made from various raw materials, such as $Al_2O_3$, SiC, BC, Fe and Ni.

In one embodiment of the present invention the reinforcing filler is chosen from wollastonite and glass fiber. Among fibrous fillers, glass fibers are preferred; they include chopped strand A-, E-, C-, D-, S-, T- and R-glass fibers, as described in chapter 5.2.3, p. 43-48 of Additives for Plastics Handbook, $2^{nd}$ edition, John Murphy.

Glass fibers optionally comprised in polymer composition (C) may have a circular cross-section or a non-circular cross-section (such as an oval or rectangular cross-section).

When the glass fibers used have a circular cross-section, they preferably have an average glass fiber diameter of 3 to 30 µm and particularly preferred of 5 to 12 µm. Different sorts of glass fibers with a circular cross-section are available on the market depending on the type of the glass they are made of. One may notably cite glass fibers made from E- or S-glass.

Good results were obtained with standard E-glass material with a non-circular cross section. Excellent results were obtained when the polymer composition with S-glass fibers with a round cross-section and, in particular, when using round cross-section with a 6 µm diameter (E-Glass or S-glass).

In another embodiment of the present invention the reinforcing filler is a carbon fiber.

As used herein, the term "carbon fiber" is intended to include graphitized, partially graphitized and ungraphitized carbon reinforcing fibers or a mixture thereof. Carbon fibers useful for the present invention can advantageously be obtained by heat treatment and pyrolysis of different polymer precursors such as, for example, rayon, polyacrylonitrile (PAN), aromatic polyamide or phenolic resin; carbon fibers useful for the present invention may also be obtained from pitchy materials. The term "graphite fiber" intends to denote carbon fibers obtained by high temperature pyrolysis (over 2000° C.) of carbon fibers, wherein the carbon atoms place in a way similar to the graphite structure. Carbon fibers useful for the present invention are preferably chosen from the group composed of PAN-based carbon fibers, pitch based carbon fibers, graphite fibers, and mixtures thereof.

The weight of said reinforcing filler is advantageously preferably below 60% wt., more preferably below 50% wt., even more preferably below 45% wt., most preferably below 35% wt., based on the total weight of the composition (C).

Preferably, the reinforcing filler is present in an amount ranging from 10 to 60% wt., preferably from 20 to 50% wt., preferably from 25 to 45% wt., most preferably from 25 to 35% wt., based on the total weight of the composition (C).

The composition (C) may further optionally comprise one or more than one additional ingredient (I) different from the reinforcing filler and from the copolymer (PEDEK/PEEK), as above detailed, generally selected from the group consisting of (i) colorants such as notably a dye, (ii) pigments such as notably titanium dioxide, zinc sulfide and zinc oxide, (iii) light stabilizers, e.g. UV stabilizers, (iv) heat stabilizers, (v) antioxidants such as notably organic phosphites and phosphonites, (vi) acid scavengers, (vii) processing aids, (viii) nucleating agents, (ix) internal lubricants and/or external lubricants, (x) flame retardants, (xi) smoke-suppressing agents, (x) anti-static agents, (xi) anti-blocking agents, (xii) conductivity additives such as notably carbon black and carbon nanofibrils, (xiii) plasticizers, (xiv) flow modifiers, (xv) extenders, (xvi) metal deactivators, and combinations comprising one or more of the foregoing additives.

When one or more than one additional ingredient (I) are present, their total weight, based on the total weight of polymer composition (C), is usually below 20%, preferably below 10%, more preferably below 5% and even more preferably below 2%.

According to certain embodiments, the composition (C) comprises the copolymer (PEDEK/PEEK), as above detailed, in combination with one or more than one additional polymeric components, such as polyarylether polymers different from copolymer (PEDEK/PEEK), including e.g. PEEK, PEK, PEKK, sulfone polymers, polyaryl sulphides, and the like.

According to other embodiments, the copolymer (PEDEK/PEEK), as above detailed, is the only polymeric component in the composition (C).

The expression 'polymeric components' is to be understood according to its usual meaning, i.e. encompassing compounds characterized by repeated linked units, having typically a molecular weight of 2000 or more.

If desired, the composition (C) comprises more than 80 wt. % of the copolymer (PEDEK/PEEK), as above detailed, optionally with the proviso that the copolymer (PEDEK/PEEK), as above detailed, is the only polymeric component in the composition (C), and comprises one or more than one reinforcing filler and/or additional ingredient (I) might be present therein.

The composition (C) can be prepared by a variety of methods involving intimate admixing of the at least one copolymer (PEDEK/PEEK), as above detailed, optionally the reinforcing filler and optionally additional ingredient (I) desired in the polymeric material, for example by dry blending, suspension or slurry mixing, solution mixing, melt mixing or a combination of dry blending and melt mixing.

Typically, the dry blending of copolymer (PEDEK/PEEK), as detailed above, preferably in powder state, optionally the reinforcing filler and optionally additional ingredient (I) is carried out by using high intensity mixers, such as notably Henschel-type mixers and ribbon mixers so as to obtain a physical mixture, in particular a powder mixture of the at least one copolymer (PEDEK/PEEK), optionally the reinforcing filler and optionally additional ingredient (I).

Alternatively, the intimate admixing of the at least one copolymer (PEDEK/PEEK), optionally the reinforcing filler and optionally additional ingredient (I) desired in the composition (C), is carried out by tumble blending based on a single axis or multi-axis rotating mechanism so as to obtain a physical mixture.

Alternatively, the slurry mixing of the copolymer (PEDEK/PEEK), optionally the reinforcing filler and optionally additional ingredient (I) is carried out by first slurrying said copolymer (PEDEK/PEEK), as above detailed, in powder form, optionally the reinforcing filler and optionally additional ingredient (I) using an agitator in an appropriate liquid such as for example methanol, followed by filtering the liquid away, so as to obtain a powder mixture of the at least one copolymer (PEDEK/PEEK), optionally the reinforcing filler and optionally additional ingredient (I).

In another embodiment, the solution mixing of the copolymer (PEDEK/PEEK), as detailed above, optionally the reinforcing filler and optionally additional ingredient (I) using an agitator in an appropriate solvent or solvent blends such as for example diphenyl sulfone, benzophenone, 4-chlorophenol, 2-chlorophenol, meta-cresol. Diphenyl sulfone and 4-chlorophenol are most preferred.

Following the physical mixing step by one of the aforementioned techniques, the physical mixture, in particular the obtained powder mixture, of the at least one copolymer (PEDEK/PEEK), optionally the reinforcing filler and optionally additional ingredient (I) is typically melt fabricated by known methods in the art including notably melt fabrication processes such as compression molding, injection molding, extrusion and the like, to provide shaped articles, including notably part(s) of an oil and gas recovery article or a finished oil and gas recovery article, as explained below in more detail.

So obtained physical mixture, in particular the obtained powder mixture can comprise the copolymer (PEDEK/PEEK), the reinforcing filler, as detailed above, and optionally, other ingredients (I) in the weight ratios as above detailed, or can be a concentrated mixture to be used as masterbatch and diluted in further amounts of the copolymer (PEDEK/PEEK), as above detailed, the reinforcing filler, as detailed above, and optionally, other ingredients (I) in subsequent processing steps. For example, the obtained physical mixture can be extruded into a stock shape like a slab or rod from which a final part can be machined. Alternatively, the physical mixture can be compression or injection molded into a finished part of the oil and gas recovery article or into a stock shape from which a finished part of the oil and gas recovery article can be machined.

It is also possible to manufacture the composition of the invention by further melt compounding the powder mixture as above described. As said, melt compounding can be effected on the powder mixture as above detailed, or directly on the copolymer (PEDEK/PEEK), as above detailed, the reinforcing filler, as detailed above, and optionally, other ingredients (I). Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

If desired, the design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients. Provided that optimum mixing is achieved between the bulk polymer and filler contents, it is advantageously possible to obtain strand extrudates of the composition (C) of the invention. Strand extrudates of the composition (C) can be chopped by means e.g. of a rotating cutting knife after some cooling time on a conveyer with water spray. Thus, for example composition (C) which may be present in the form of pellets or beads can then be further used for the manufacture of shaped articles, notably of different shape and size.

Shaped Articles

The copolymer (PEDEK/PEEK) and/or composition (C), as above detailed, can be processed by usual melt processing techniques, including notably extrusion molding, injection molding, compression molding, so as to provide shaped articles.

According to certain embodiment's shaped articles are under the form of substantially bidimensional articles, e.g. parts wherein one dimension (thickness or height) is significantly less than the other two characterizing dimensions (width and length), such as notably films and sheets.

According to other embodiment's, shaped articles are provided as three-dimensional parts, e.g. substantially extending in the three dimensions of space in similar manner, including under the form of complex geometries parts, e.g. with concave or convex sections, possibly including undercuts, inserts, and the like.

According to certain embodiments, shaped articles made from the copolymer (PEDEK/PEEK) and/or composition (C), as above detailed, are provided as part(s) of oil and gas recovery article(s).

Use of the Copolymer (PEDEK/PEEK) in O&G

The invention further pertains to a method of making parts included in devices used for oil & gas recovery, including shaping those parts from the copolymers (PEDEK/PEEK) or from any composition comprising the same. Shaping can be achieved through any melt processing technique, including notably extrusion molding, injection molding, compression molding, and the like.

An oil and gas recovery article including at least one part made from a copolymer (PEDEK/PEEK), as above detailed, or from a composition comprising the same is still another object of the present invention.

To the purposes of the invention, the term "oil and gas recovery article" is intended to denote any article that is designed to conveniently be used in oil and gas recovery applications, in particular in HP/HT conditions.

For the sake of clarity, the term "part of an oil and gas recovery article" is intended to denote a piece or portion which is combined with others to make up the whole oil and gas recovery article. The external coating of an oil and gas recovery article falls thus within this scope. Thus, the at least one part of the oil and gas recovery article according to the present invention, can be a coating.

Representative examples of oil and gas recovery applications, but not limited to, include (i) drilling and completion of deep, higher temperature, higher pressure oil and gas wells, as notably described in U.S. Pat. No. 5,662,170 the entire disclosure of those are incorporated herein by reference, (ii) an oil and gas recovery method as traditionally subdivided in three stages, namely a primary oil recovery stage, a secondary or assisted oil recovery and a tertiary or enhanced oil recovery stage (iii) gas and oil gathering treatment applications, (iv) complex transportation of gas and oil from said deep, higher temperature, higher pressure wells to refineries and the like.

All these applications as herein mentioned above, are well familiar to the skilled person, and should be understood under their common meaning.

As non limitative examples of oil and gas recovery articles useful in the present invention are drilling systems; drilling rigs; compressor systems, as notably described in published U.S. Pat. Appl. US 2010239441, the entire disclosure of which is incorporated herein by reference; pumping systems; motor systems, sensors, such as reservoir sensors; control systems, such as temperature and/or pressure; stimulation and flow control systems; liner hanger systems, as notably described in U.S. Pat. No. 6,655,456, the entire disclosure of which is incorporated herein by reference; packer systems, as notably described in U.S. Pat. No. 7,874,356, the entire disclosure of which is incorporated herein by reference; pipe systems, valve systems, tubing systems, casing systems, and others.

All these systems as herein mentioned above, are well familiar to the skilled person, and should be understood under their common meaning.

By the term "drilling rig" is meant a structural housing equipment that is used to drill oil wells, or natural gas extraction wells, and may comprise a single article or comprise two or more components. Typically components of said drilling rig include, but not limited to, mud tanks, shale shakers, mud pumps, drill pipes, drill bits, drilling lines, electric cable trays.

As non limitative examples of pumping systems useful in the present invention are jet pump systems, submersible pumping systems, in particular electric submersible pumps, as notably described in U.S. Pat. No. 6,863,124 the entire disclosure of which is incorporated herein by reference, beam pumps.

As non limitative examples of motor systems useful in the present invention are mud motor assemblies, as notably described in U.S. Pat. No. US 2012234603, the entire disclosure of which is incorporated herein by reference.

As non limitative examples of pipe systems useful in the present invention, mention can be made of pipes including rigid pipes and flexible pipes, flexible risers, pipe-in-pipe, pipe liners, subsea jumpers, spools, umbilicals.

Typical flexible pipes have been described by way of example in WO 01/61232, U.S. Pat. Nos. 6,123,114 and 6,085,799; the entire disclosure of those are incorporated herein by reference. Such flexible pipes can notably be used for the transport of fluids where very high or very different water pressure prevails over the length of the pipe, and for example can take the form of flexible risers which run from the ocean floor up to equipment at or in the vicinity of the ocean surface, and they can also generally be used as pipes for the transport of liquids or gases between various items of equipment, or as pipes laid at great depth on the ocean floor, or as pipes between items of equipment close to the ocean surface, and the like.

Preferred pipe systems are pipes, flexible risers and pipe liners.

By the term "valves" is meant any device for halting or controlling the flow of a liquid, gas, or any other material through a passage, pipe, inlet, outlet, and the like. As non limitative examples of valve systems useful in the present invention, mention can especially be made of choke valves, thermal expansion valves, check valves, ball valve, butterfly valve, diaphragm valve, gate valve, globe valve, knife valve, needle valve, pinch valve, piston valve, plug valve, poppet valve, spool valve, pressure reducing valve, sampling valves, safety valve.

The at least one part of the oil and gas recovery articles according to the present invention may be selected from a large list of articles such as fitting parts; such as seals, in particular sealing rings, preferably backup seal rings, fasteners and the like; snap fit parts; mutually moveable parts; functional elements, operating elements; tracking elements; adjustment elements; carrier elements; frame elements; films; switches; connectors; wires, cables; bearings, housings, compressor components such as compressor valves and compressor plates, any other structural part other than housings as used in an oil and gas recovery articles, such as for example shafts, shells, pistons.

In particular, the copolymer (PEDEK/PEEK) is very well suited for the production of seals, fasteners, cables, electrical connectors, housing parts of oil and gas recovery articles.

In one preferred embodiment, the at least one part of the oil and gas recovery article according to the present invention, is advantageously an oil and gas recovery housing, a seal, an electrical connector or a cable.

A cable can be notably wires electrically connecting the different parts within an oil and gas recovery article, for example connecting different electrical connectors, connecting tools to connectors, instruments or other tools, connecting instruments to connectors, other instruments or tools, connecting a power source to connectors, instruments or tools. A cable can also advantageously be used for carrying a signal to computer systems.

In a particularly preferred embodiment, the cable is a coated wire.

By "oil and gas recovery housing" is meant one or more of the back cover, front cover, frame and/or backbone of an oil and gas recovery article. The housing may be a single article or comprise two or more components. By "backbone" is meant a structural component onto which other components of the oil and gas recovery article, are mounted. The backbone may be an interior component that is not visible or only partially visible from the exterior of the oil and gas recovery article.

Typical fasteners have been described by way of example in WO 2010/112435, the entire disclosure of those are incorporated herein by reference, and include, but not limited to, threaded fasteners such as bolts, nuts, screws, headless set screws, scrivets, threaded studs and threaded bushings, and unthreaded fastener, such as notably pins, retaining rings, rivets, brackets and fastening washers and the like.

Sealing of components of oil and gas recovery articles is important and it can be said that seals are used in all types of oil and gas recovery articles, as well as those used in parts of oil and gas recovery articles which remains in the well after completion, testing and production of the well. Thus the seals need to resist to these extreme conditions, as mentioned above, in substantially indefinite time. It is worthwhile mentioning that seals besides electronics can be considered as the most vulnerable parts of oil and gas recovery articles.

In one embodiment of the present invention, the at least part of an oil and gas recovery article is a seal system, wherein said seal system is selected from a group consisting of a metal seal, an elastomeric seal, a metal-to-metal seal and an elastomeric and metal-to-metal seal.

Seal systems are typically used in drill bits, motor systems, in particular mud motors, reservoir sensors, stimulation and flow control systems, pump systems, in particular electric submersible pumps, packers, liner hangers, tubing's, casings and the like.

Representative examples of seal systems are, without limitation, seal rings such as notably C-rings, E-rings, O-rings, U-rings, spring energized C-rings, backup rings and the like; fastener seals; piston seals, gask-O-seals; integral seals, labyrinth seals.

In a particularly preferred embodiment, the at least one part of the oil and gas recovery article according to the present invention, is a seal ring, preferably a backup seal ring.

The weight of the copolymer (PEDEK/PEEK), based on the total weight of oil and gas recovery article, is usually above 1%, above 5%, above 10%, preferably above 15%, above 20%, above 30%, above 40%, above 50%, above 60%, above 70%, above 80%, above 90%, above 95%, above 99%.

The oil and gas recovery article may consist of one part, i.e. it is a single-component article. Then, the single part preferably consists of the copolymer (PEDEK/PEEK) or of any composition thereof.

Alternatively, the oil and gas recovery article may consist of several parts. The case being, either one part or several parts of the oil and gas recovery article may consist of the copolymer (PEDEK/PEEK) or of any composition thereof. When several parts of the oil and gas recovery article consist of copolymer (PEDEK/PEEK) or of any composition thereof, each of them may consist of the very same copolymer (PEDEK/PEEK) or of any composition thereof; alternatively, at least two of them may consist of different copolymer (PEDEK/PEEK) or of any composition thereof.

Another objective of the present invention is to provide a method for the manufacture of the above described part of the oil and gas recovery article. Such method is not specifically limited. The copolymer (PEDEK/PEEK) or a composition comprising the same, as above detailed, may be generally processed by injection molding, extrusion molding, compression molding, or other shaping technologies.

In one embodiment of the present invention, the method for the manufacture of the above described part of the oil and gas recovery article or oil and gas recovery article includes the step of compression molding or injection molding and subsequent solidification of the copolymer (PEDEK/PEEK) or of the composition comprising the same.

In another embodiment, the method for the manufacture of the above described part of the oil and gas recovery article or oil and gas recovery article includes the step of coating.

For example, the copolymer (PEDEK/PEEK) or the composition comprising the same can be applied to a wire as a coating by using any suitable coating method, preferably by extrusion coating around a wire to form a coated wire.

Techniques for manufacturing wire coatings are well known in the art.

In another embodiment of the present invention, the method for the manufacture of the above described part of the oil and gas recovery article or the oil and gas recovery article, as described above includes the machining of a standard shaped structural part in a part having any type of size and shape. Non limiting examples of said standard shaped structural part include notably a plate, a rod, a slab and the like. Said standard shaped structural parts can be obtained by extrusion molding, compression molding or injection molding of the copolymer (PEDEK/PEEK) or of the composition comprising the same.

Method of Recovering Oil and/or Gas Using the Copolymer (PEDEK/PEEK)

According to another aspect of the present invention, it is hereby provided a method for recovering oil and/or gas including using at least one oil and gas recovery article as defined above.

The method of the invention is advantageously a method for recovering oil and/or gas from a subterranean formation including using said oil and gas recovery article.

The subterranean formations can be advantageously deeply buried reservoir, wherein temperatures close to 300 C at a depth of more than 6,000 meters and pressures of over 1,500 bar can be encountered: the said oil and gas articles of the invention possess all the requisites and properties for being qualified to withstand this below-ground inferno over long periods of time.

The method of the invention may advantageously comprises at least one of the operations selected from the group consisting of:
1. drilling at least one borehole for exploring or exploiting an oil and/or gas reservoir in a subterranean formation using at least one oil and gas recovery article as defined above;
2. completing at least one well using at least one oil and gas recovery article as defined above;
3. transporting oil and/or gas from an oil and/or gas reservoir in a subterranean formation to the ground level.

The operation of drilling boreholes for exploring or exploiting oil and/or natural gas reservoirs generally includes the use of drilling rig equipment, which is an embodiment of the oil and gas recovery article as defined above.

FIG. 1 schematically depicts drilling rig equipment. In this equipment a drill pipe or string (#5) acts as a conduit for a drilling fluid; it is generally made of joints of hollow tubing connected together and stood in the derrick vertically. A drill bit (#7) device is attached to the end of the drill string; this bit breaks apart the rock being drilled. It also contains jets through which the drilling fluid exits. The rotary table (#6) or a top drive (not shown) rotates the drill string along with the attached tools and bit.

A mechanical section or draw-works section (#13) contains the spool, whose main function is to reel in/out the drill line to raise/lower the travelling block.

A mud pump (#11) is used to circulate drilling fluid through the system; the mud is suctioned from the mud tank or mud pit (#9) which provides a reserve store of drilling fluid. The mud flows through the conduit #14 and through the drill pipe (#5) down to the bit (#7). Loaded with drill cuttings it flows upwards in the borehole and is extracted through the conduit (#12) back to the mud pit. A shale shaker (#10) separates drill cuttings from the drilling fluid before it is pumped back down the borehole.

The equipment can further comprise devices installed at the wellhead to prevent fluids and gases from unintentionally escaping from the borehole (not shown).

Any of the components of the drilling rig as above detailed maybe an oil and gas recovery article, as above detailed, i.e. may comprise at least a part comprising the copolymer (PEDEK/PEEK) or any composition thereof, as above defined.

The operation b) of completing a well is the operation comprehensive of all the preparation or outfitting operations required for bringing in operations a geologic formation from the wellbore. This principally involves preparing the bottom of the hole to the required specifications, running in the production tubing and its associated down hole tools and controlling devices as well as perforating and stimulating as required. Sometimes, the process of running in and cementing the casing is also included. In all these single operations, articles comprising at least one part comprising the copolymer (PEDEK/PEEK) or any composition thereof, as above detailed, can be used.

The invention will be now be described with reference to the following examples, whose purpose is merely illustrative and not intended to limit the scope of the present invention.

EXAMPLES

The following Examples demonstrate the synthesis of copolymers (PEDEK-PEEK), their thermal properties and their chemical resistance to sweet salt water environment.

Raw Materials

PAEK:

KETASPIRE® KT-820P (KT-820P herein after) is an aromatic polyetheretherketone (PEEK) polymer available from Solvay Specialty Polymers USA, LLC.

Cypek® FC (PEKK FC, herein after) and HT (PEKK HT, herein after) are aromatic polyetherketoneketones (PEKK) available from Solvay S.A. Arlon® 2000 is an aromatic polyetherketone (PEK, herein after) available from Green, Tweede & Company, USA.

Hydroquinone Photo-Grade was procured from Eastman.

4,4'-biphenol, polymer grade, was procured from SI, USA.

4,4'-difluorobenzophenone, polymer grade, was procured from Jintan, China.

Diphenyl sulfone (polymer grade) was procured from Proviron (99.8% pure).

Sodium carbonate, light soda ash, was procured from Solvay S.A., France.

Potassium carbonate with a $d_{90}$<45 µm was procured from Armand products.

Lithium chloride was procured from Acros

Determination of Reduced Viscosity

Reduced viscosity (RV) was measured pursuant to ASTM D2857 standard at 25° C. on 1.0 wt/vol % solutions in concentrated $H_2SO_4$ (96 wt % minimum), using a Cannon—Fenske capillary, size 200.

Determination of the Chlorine Content in Polymer by Microcoulometry

Using forceps, a clean, dry combustion boat was placed onto a microbalance, and the balance was zeroed. One to five mg of polymer sample was weighed into said dried combustion boat and weight was recorded to 0.001 mg. The combustion boat and sample were placed in the introduction port of a ThermoGLAS 1200 Total Organic Halogen Analyzer, and the port was capped. The sample weight was entered into the sample weight field on the instrument computer. The sample analysis cycle was then started. The sample was burned in a mixture of argon and oxygen and the combustion products were passed through concentrated sulfuric acid scrubber to remove moisture and byproduct. Hydrogen chloride and oxychlorides from the combustion process were absorbed into the cell acetic acid solution from the gas stream. Chloride entered the cell was titrated with silver ions generated coulometrically. Percent chlorine in the sample was calculated from the integrated current and the sample weight. The resulting percent chlorine value was converted to chlorine end group concentration in microequivalents per gram.

Determination of the Glass Transition Temperature, Melting Temperature and Heat of Fusion The glass transition temperature $T_g$ was determined by the mid-point method and the melting temperature $T_m$ was determined as the peak temperature of the melting endotherm on the $2^{nd}$ heat scan in differential scanning calorimeter (DSC) according to ASTM D3418-03, E1356-03, E793-06, E794-06. Details of the procedure as used in this invention are as follows: a TA Instruments DSC Q20 was used with nitrogen as carrier gas (99.998% purity, 50 mL/min). Temperature and heat flow calibrations were done using indium. Sample size was 5 to 7 mg. The weight was recorded ±0.01 mg. The heat cycles were:

$1^{st}$ heat cycle: 30.00° C. to 450.00° C. at 20.00° C./min, isothermal at 450.00° C. for 1 min;

$1^{st}$ cool cycle: 450.00° C. to 30.00° C. at 20.00° C./min, isothermal for 1 min;

$2^{nd}$ heat cycle: 30.00° C. to 450.00° C. at 20.00° C./min, isothermal at 450.00° C. for 1 min.

The melting temperature $T_m$ was determined as the peak temperature of the melting endotherm on the $2^{nd}$ heat scan.

The crystallinity level of the molded plaque was determined measuring the enthalpy of fusion, as determined on the $1^{st}$ heat scan of the DSC of the plaque and was taken as the area over a linear baseline drawn from above the $T_g$ to a temperature above end of the endotherm.

Determination of the Melt Viscosity

The melt viscosity was measured using a capillary rheometer pursuant to ASTM D3835 standard. Readings were taken after 10 minute dwell time at 410° C. and a shear rate of 46.3 $s^{-1}$ using a tungsten-carbide die with the following characteristics: diameter=1.016 mm, length=20.32 mm, cone angle=120°

Comparative Example D: Preparation of PEDEK-PEEK Copolymer 50/50

In a 1000 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 288.96 g of diphenyl sulfone, 28.718 g of hydroquinone, 48.415 g of 4,4' biphenol and 114.258 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 57.044 g of $Na_2CO_3$ and 0.359 g of $K_2CO_3$ was added via a powder dispenser to the reaction mixture over 30 minutes. At the end of the addition, the reaction mixture was heated to 320° C. at 1° C./minute. After 2 minutes at 320° C., 13.616 g of 4,4'-difluorobenzophenone were added to the reaction mixture while keeping a nitrogen purge on the reactor. After 5 minutes, 0.887 g of lithium chloride were added to the reaction mixture. 10 minutes later, another 4.539 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 150 g of a white powder. The structure of the obtained copolymer can be sketched, in terms of repeat units, as follows:

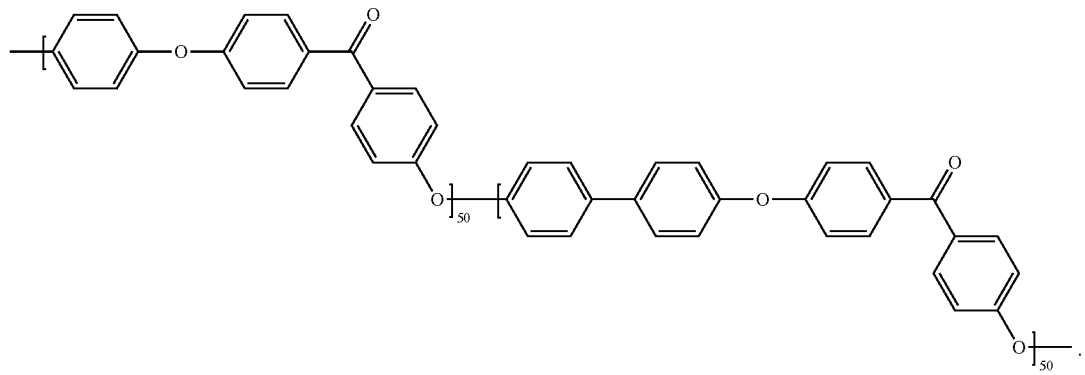

The reduced viscosity of the copolymer, measured at 1 wt/vol % in 96% $H_2SO_4$ at 25° C., as above detailed, was found to be 1.25 dL/g.

Comparative Example E: Preparation of PEDEK-PEEK Copolymer 40/60

In a 1000 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 287.65 g of diphenyl sulfone, 35.123 g of hydroquinone, 39.477 g of 4,4' biphenol and 116.455 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 58.141 g of $Na_2CO_3$ and 0.366 g of $K_2CO_3$ was added via a powder dispenser to the reaction mixture over 30 minutes. At the end of the addition, the reaction mixture was heated to 320° C. at 1° C./minute. After 2 minutes at 320° C., 13.878 g of 4,4'-difluorobenzophenone were added to the reaction mixture while keeping a nitrogen purge on the reactor. After 5 minutes, 0.904 g of lithium chloride were added to the reaction mixture. 10 minutes later, another 4.626 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 160 g of a white powder. The structure of the obtained copolymer can be sketched, in terms of repeat units, as follows:

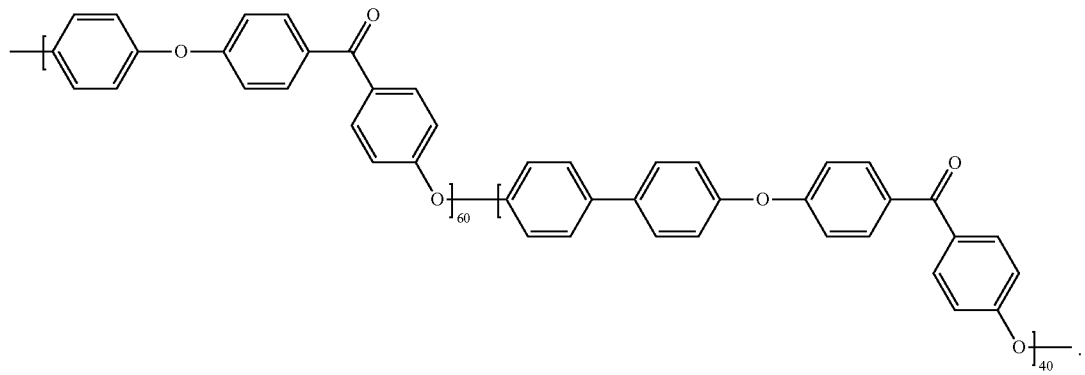

The reduced viscosity of the copolymer, measured at 1 wt/vol % in 96% $H_2SO_4$ at 25° C., as above detailed, was found to be 1.35 dL/g.

Comparative Example F: Preparation of PEDEK-PEEK Copolymer 75/25 Following Example 3 of U.S. Pat. No. 4,766,197

The procedure as detailed in example 3 of U.S. Pat. No. 4,766,197 was repeated at the 0.45 mol scale and yielded 133 g of a white powder, having molecular structure schematized as follows:

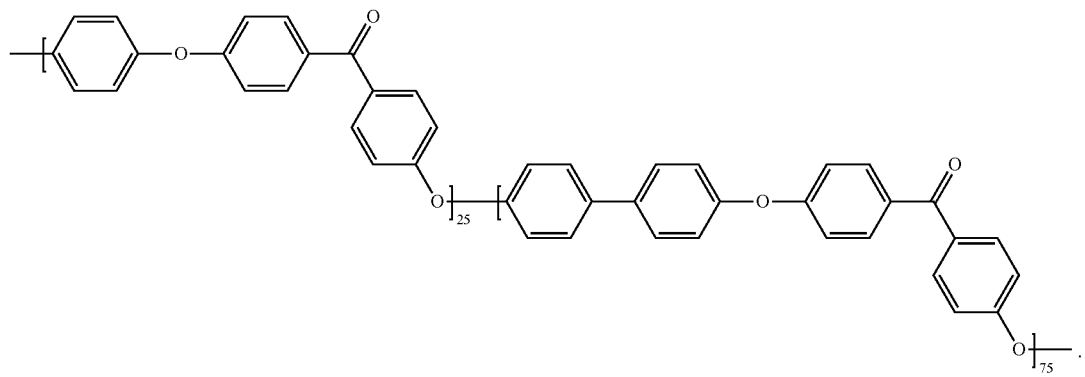

The reduced viscosity of the copolymer, measured at 1 wt/vol % in 96% $H_2SO_4$ at 25° C., as above detailed, was found to be 3.13 dL/g. The melt viscosity measured by capillary rheology at 410° C., 46 $s^{-1}$, as above detailed, was found to be higher than 15.0 kN-s/$m^2$. The polymer exhibited a chlorine content by microcoulometry of 17.1 µeq/g=610 wtppm Cl.

Comparative Example G: Preparation of PEDEK-PEEK Copolymer 30/70

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 129.80 g of diphenyl sulfone, 18.942 g of hydroquinone, 13.686 g of 4,4' biphenol and 54.368 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 26.876 g of $Na_2CO_3$ and 0.1524 g of $K_2CO_3$ was added via a powder dispenser to the reaction mixture over 30 minutes. At the end of the addition, the reaction mixture was heated to 320° C. at 1° C./minute. After 10 minutes at 320° C., 6.415 g of 4,4'-difluorobenzophenone were added to the reaction mixture while keeping a nitrogen purge on the reactor. After 5 minutes, 0.418 g of lithium chloride were added to the reaction mixture. 10 minutes later, another 2.138 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 73 g of a white powder. The structure if the obtained copolymer can be sketched, in terms of repeat units, as follows:

The melt viscosity, measured by capillary rheology at 410° C., 46 $s^{-1}$ was found to be 0.16 kN-s/$m^2$.

Example 1: Preparation of PEDEK-PEEK Copolymer 60/40

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 127.70 g of diphenyl sulfone, 9.894 g of hydroquinone, 25.103 g of 4,4' biphenol and 50.130 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 25.097 g of $Na_2CO_3$ and 0.155 g of $K_2CO_3$ was added via a powder dispenser to the reaction mixture over 30 minutes. At the end of the addition, the reaction mixture was heated to 320° C. at 1° C./minute. After 2 minutes at 320° C., 5.892 g of 4,4'-difluorobenzophenone were added to the reaction mixture while keeping a nitrogen purge on the reactor. After 5 minutes, 0.384 g of lithium chloride were added to the reaction mixture. 10 minutes later, another 1.964 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then

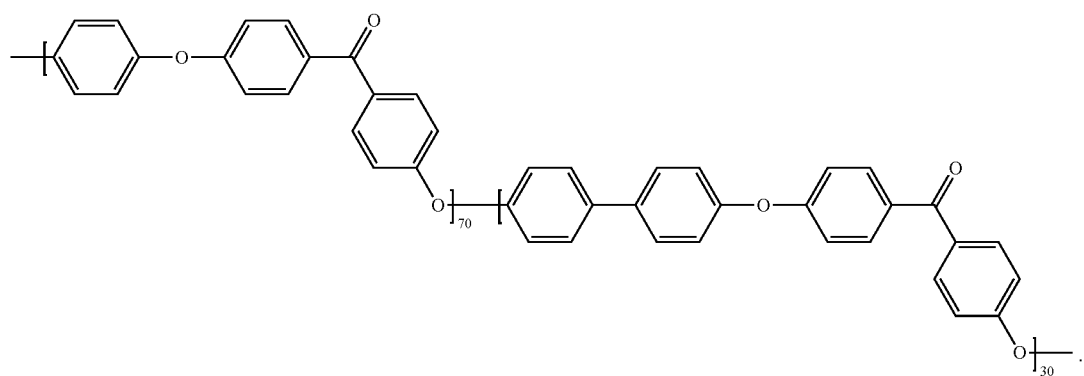

removed from the reactor and dried at 120° C. under vacuum for 12 hours yielding 74 g of a white powder. The structure of the obtained copolymer can be sketched, in terms of repeat units, as follows:

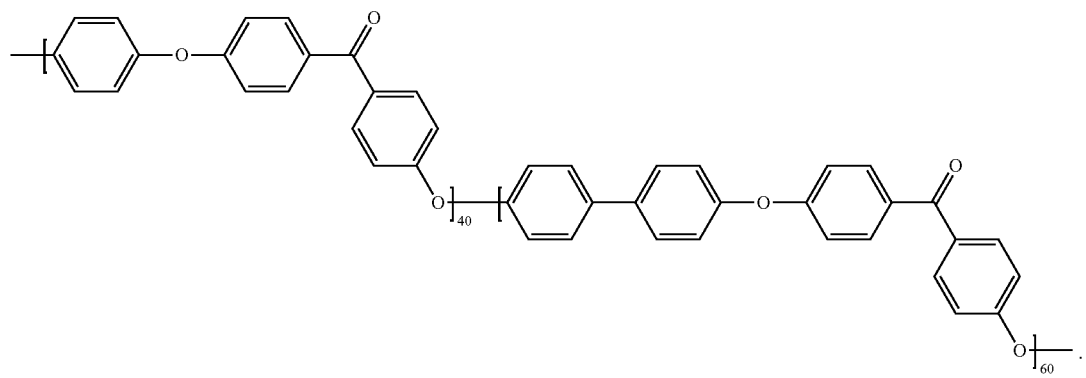

The melt viscosity, measured by capillary rheolology at 410° C., 46 s$^{-1}$ was found to be 0.18 kN-s/m$^2$.

Example 2: Preparation of PEDEK-PEEK Copolymer 60/40

In a 500 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 127.95 g of diphenyl sulfone, 9.940 g of hydroquinone, 25.138 g of 4,4' biphenol and 50.273 g of 4,4'-difluorobenzophenone. The flask content was evacuated under vacuum and then filled with high purity nitrogen (containing less than 10 ppm O$_2$). The reaction mixture was then placed under a constant nitrogen purge (60 mL/min).

The reaction mixture was heated slowly to 150° C. At 150° C., a mixture of 24.325 g of Na$_2$CO$_3$ and 0.1244 g of K$_2$CO$_3$ was added via a powder dispenser to the reaction mixture over 30 minutes. At the end of the addition, the reaction mixture was heated to 320° C. at 1° C./minute. After 2 minutes at 320° C., 5.892 g of 4,4'-difluorobenzophenone were added to the reaction mixture while keeping a nitrogen purge on the reactor. After 5 minutes, 0.384 g of lithium chloride were added to the reaction mixture. 10 minutes later, another 1.964 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 74 g of a white powder. The structure of the obtained copolymer can be sketched, in terms of repeat units, as follows:

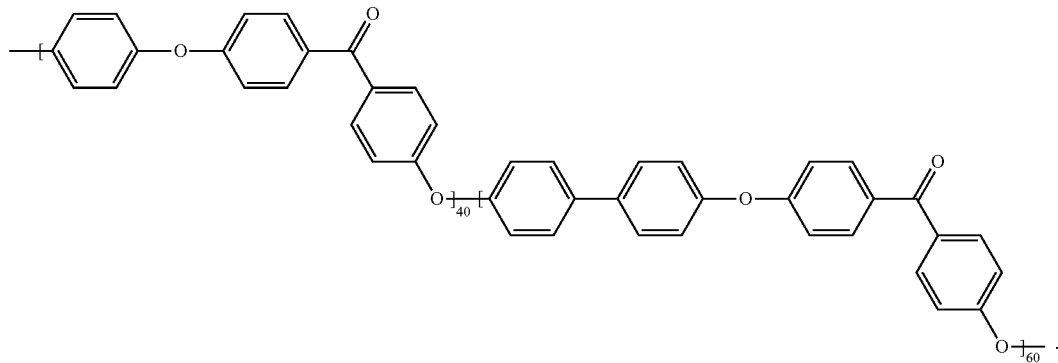

The melt viscosity measured by capillary rheolology, as above detailed, at 410° C., 46 s$^{-1}$ was found to be 1.85 kN-s/m$^2$.

Example 3: Preparation of PEDEK-PEEK Copolymer 60/40

In a 500 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 145.87 g of diphenyl sulfone, 9.940 g of hydroquinone, 25.138 g of 4,4' biphenol and 49.831 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 24.682 g of $Na_2CO_3$ and 0.1555 g of $K_2CO_3$ was added via a powder dispenser to the reaction mixture over 30 minutes. At the end of the addition, the reaction mixture was heated to 340° C. at 1° C./minute. After 20 minutes at 340° C., 5.892 g of 4,4'-difluorobenzophenone were added to the reaction mixture while keeping a nitrogen purge on the reactor. After 5 minutes, 0.384 g of lithium chloride were added to the reaction mixture. 10 minutes later, another 1.964 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 75 g of a white powder. The structure of the obtained copolymer can be sketched, in terms of repeat units, as follows:

The melt viscosity, measured by capillary rheolology as above detailed, at 410° C., 46 $s^{-1}$, was found to be 1.89 $kN-s/m^2$.

Example 4: Preparation of PEDEK-PEEK Copolymer 70/30

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 145.87 g of diphenyl sulfone, 7.290 g of hydroquinone, 28.676 g of 4,4' biphenol and 48.580 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 24.134 g of $Na_2CO_3$ and 0.152 g of $K_2CO_3$ was added via a powder dispenser to the reaction mixture over 30 minutes. At the end of the addition, the reaction mixture was heated to 340° C. at 1° C./minute. After 2 minutes at 340° C., 5.761 g of 4,4'-difluorobenzophenone were added to the reaction mixture while keeping a nitrogen purge on the reactor. After 5 minutes, 0.375 g of lithium chloride were added to the reaction mixture. 10 minutes later, another 1.920 g of 4,4'-difluorobenzophenone were added to the reactor and the reaction mixture was kept at temperature for 15 minutes.

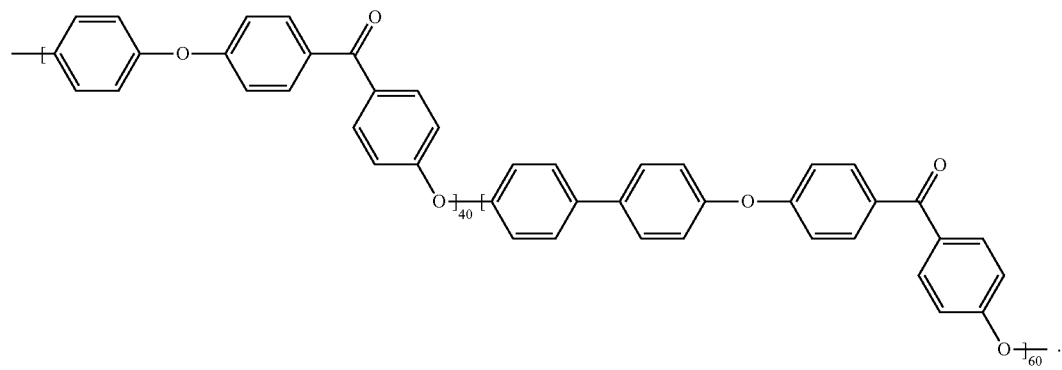

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 75 g of a white powder. The structure of the obtained copolymer can be sketched, in terms of repeat units, as follows:

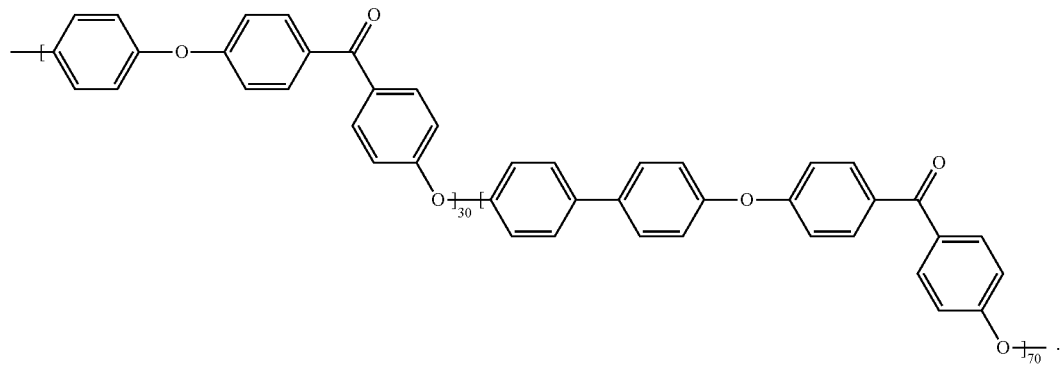

The melt viscosity measured by capillary rheology, as above detailed, at 410° C., 46 s$^{-1}$, was found to be 2.04 kN-s/m$^2$.

Example 5: Preparation of PEDEK-PEEK Copolymer 75/25

In a 500 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 212.00 g of diphenyl sulfone, 4.226 g of hydroquinone, 21.442 g of 4,4' biphenol and 33.853 g of 4,4'-difluorobenzophenone. The flask content was evacuated under vacuum and then filled with high purity nitrogen (containing less than 10 ppm O$_2$). The reaction mixture was then placed under a constant nitrogen purge (60 mL/min).

The reaction mixture was heated slowly to 150° C. At 150° C., a mixture of 16.812 g of Na$_2$CO$_3$ and 0.106 g of K$_2$CO$_3$ was added via a powder dispenser to the reaction mixture over 30 minutes. At the end of the addition, the reaction mixture was heated to 340° C. at 1° C./minute. After 7 minutes at 340° C., 3.928 g of 4,4'-difluorobenzophenone were added to the reaction mixture while keeping a nitrogen purge on the reactor. After 5 minutes, 0.651 g of lithium chloride were added to the reaction mixture. 10 minutes later, another 1.309 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 53 g of a white powder. The structure of the obtained copolymer can be sketched, in terms of repeat units, as follows:

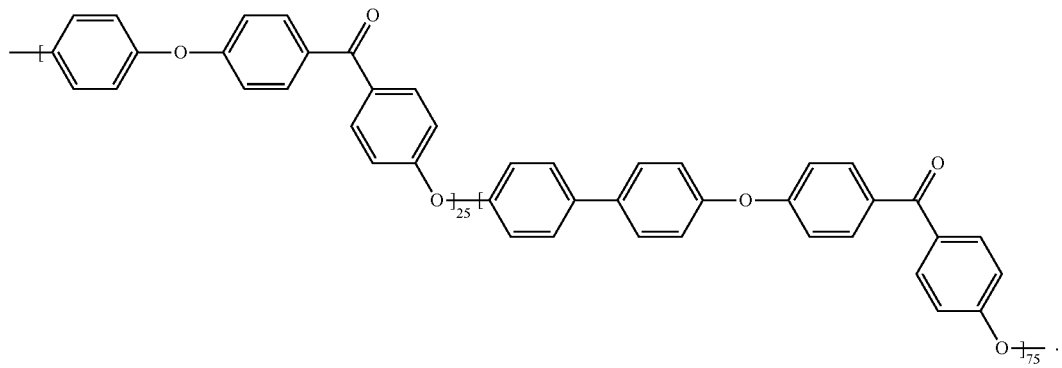

The reduced viscosity of the material measured as above detailed was 3.50 dL/g. The melt viscosity measured by capillary rheolology, as above detailed, at 410° C., 46 s$^{-1}$ was found to be 8.75 kN-s/m$^2$. The polymer was found to possess a chlorine content by microcoulometry of 0.7 µeq/g=25 wtppm Cl.

Example 6: Preparation of PEDEK-PEEK Copolymer 80/20

In a 500 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 156.09 g of diphenyl sulfone, 3.291 g of hydroquinone, 22.196 g of 4,4'-biphenol and 32.902 g of 4,4'-difluorobenzophenone. The flask content was evacuated under vacuum and then filled with high purity nitrogen (containing less than 10 ppm O$_2$). The reaction mixture was then placed under a constant nitrogen purge (60 mL/min).

The reaction mixture was heated slowly to 150° C. At 150° C., a mixture of 16.345 g of Na$_2$CO$_3$ and 0.103 g of K$_2$CO$_3$ was added via a powder dispenser to the reaction mixture over 30 minutes. At the end of the addition, the reaction mixture was heated to 340° C. at 1° C./minute. After 120 minutes at 340° C., 3.901 g of 4,4'-difluorobenzophenone were added to the reaction mixture while keeping a nitrogen purge on the reactor. After 5 minutes, 0.254 g of lithium chloride were added to the reaction mixture. 10 minutes later, another 1.300 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 53 g of a white powder. The structure of the obtained copolymer can be sketched, in terms of repeat units, as follows:

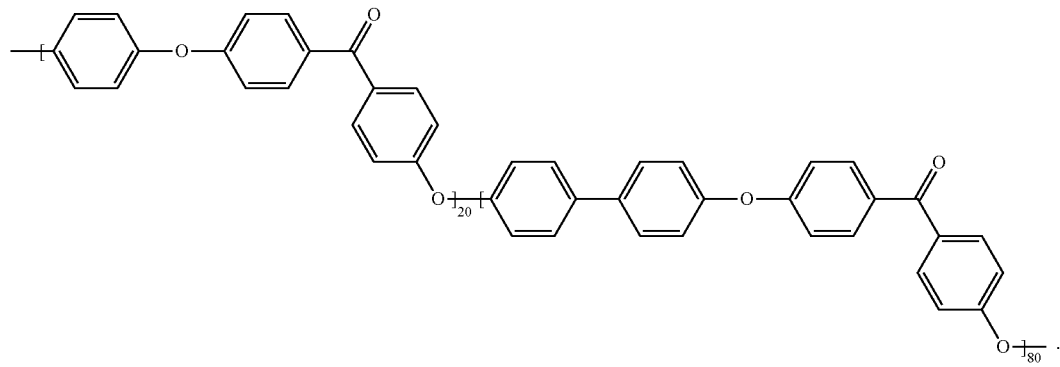

The melt viscosity measured by capillary rheology at 410° C., 46 s$^{-1}$, as above detailed, was found to be 5.33 kN-s/m$^2$.

Assessment of Thermal Performance of Copolymers (PEDEK-PEEK)

A 102 mm×102 mm×3.2 mm plaque was prepared from each of the copolymers obtained as detailed in examples and comparative examples above by compression molding under conditions matching the melting temperature of the composition:

For copolymers of examples 0 to 2, the molding conditions were:
1. preheat at 420° C.,
2. 420° C./15 minutes, under 2000 kg-f
3. 420° C./2 minutes, under 2700 kg-f
4. cool down to 320° C. over 20 minutes, under 2000 kg-f
5. 50 minute-hold at 320° C., under 2000 kg-f
6. 25 minute-cool down to 30° C., under 2000 kg-f.

The plaques so obtained were annealed under air at 275° C. for 3 hours.

For the other copolymers and PAEK polymers of comparison, the temperatures of the steps 2, 3 and 5 were modified as specified in the table herein below:

TABLE 1

| Polymer from Example: | T in steps 2 & 3 (° C.) | T in step 5 (° C.) | Annealing T (° C.) |
|---|---|---|---|
| 0-2 | 420 | 320 | 275 |
| 3-5, F | 440 | 330 | 275 |
| A | 440 | No intermediate step 5 | None |
| B-C-G-H | 400 | No intermediate step 5 | None |
| D-E | 420 | 270 | 250 |

The crystallinity level of specimens taken from plaques of copolymers (PEDEK-PEEK) was determined by DSC (one heat cycle, 20° C./min up to 450° C.), assuming 130 J/g for 100% crystalline material.

Rectangular test samples (1.2 cm×5.1 cm) were prepared from these molded plaques and were dried at 120° C. under vacuum for 12 hours.

Figure 2:
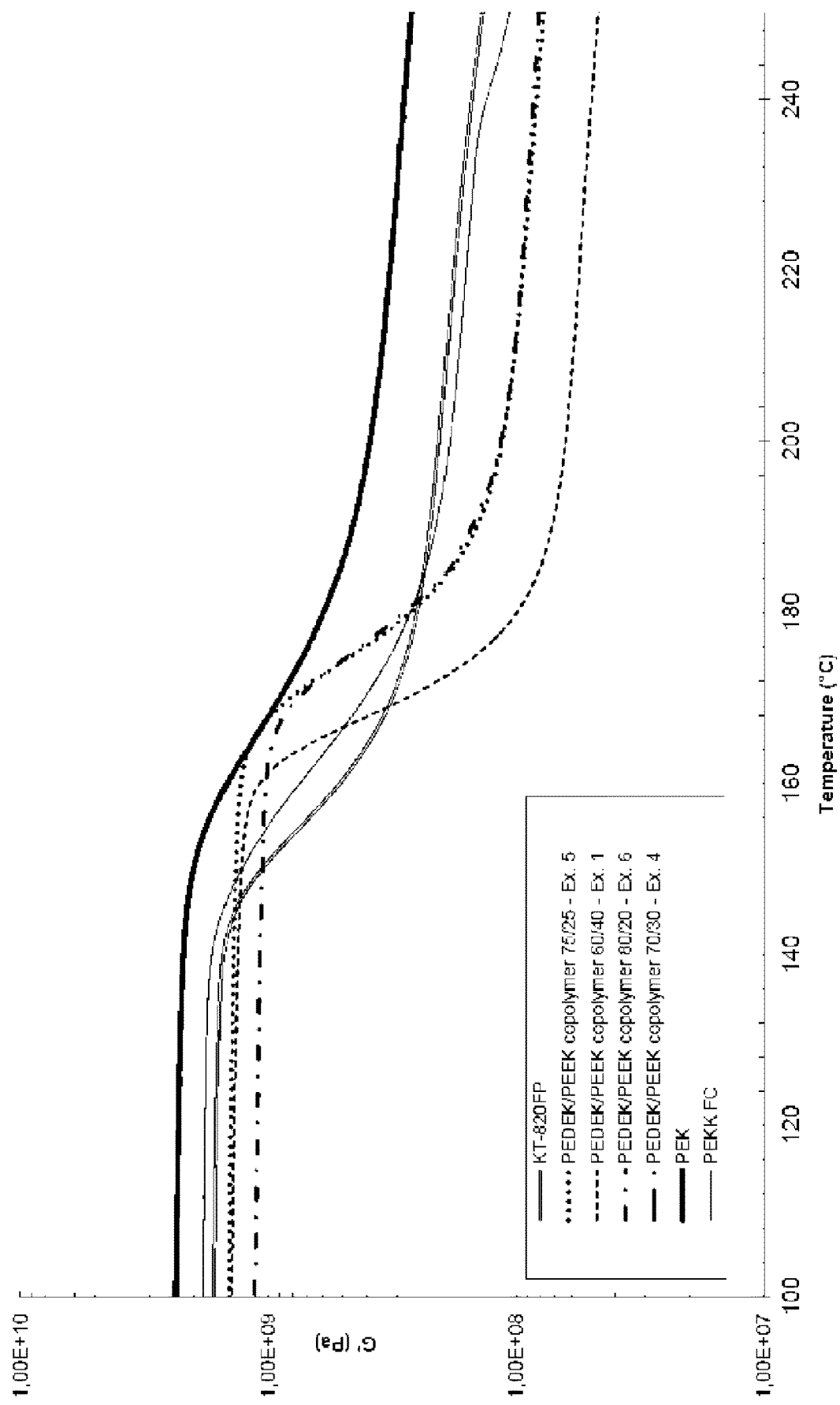
FIG. 2 is a plot of storage modulus (G', in Pa) versus temperature (° C.), as determined by DMTA analysis, for copolymers (PEDEK/PEEK) of the present invention (dotted lines), and reference PEEK, PEK and PEKK materials (solid lines).

Said test specimens were then analyzed by Dynamic Mechanical Analysis (DMTA) on a TA ARES G2 rheometer under torsion mode (10 rad/s; 0.05% strain) from 50 to 350° C. at 5.0° C./min, in order to measure the storage modulus (G' in Pa) at different temperatures, ranging from 50 up to 310° C., as shown in the following Table and presented in the graph of FIG. 2. The data shows that the copolymers (PEDEK-PEEK) of the invention present a better retention of properties at 165° C., as shown by higher percentage values of ratio G'(165° C.)/G'(140° C.) than PEEK and PEKK or copolymers PEEK-PEDEK with less than 60% moles of PEDEK-type units (Comp. ex D and E). Compositions are endowed with mechanical performances retention with temperature similar to PEK or even superior to PEK (ex. 3-5). The higher retention of properties at higher temperature is unexpected based on the $T_g$ alone (compare Ex. 0 vs Comp. D): while copolymer (PEDEK-PEEK) of Ex. 0, having PEDEK/PEEK molar ratio of 60/40 has substantially similar $T_g$ to copolymer of comparative Ex. D, having PEDEK/PEEK molar ratio of 50/50, this latter copolymer has a much inferior retention of mechanical properties with temperature, showing a G'(165° C.)/G'(140° C.) percent ratio of only 15%, which is significantly worse than the outstanding value of 41% demonstrated by the copolymer of the present invention.

TABLE 2

|  | Ex. 1 | Ex. 2 | Ex. 3 | Ex. 4 | Ex. 5 | Ex. 6 |
| --- | --- | --- | --- | --- | --- | --- |
| PEDEK/PEEK (mol/mol) | 60/40 | 60/40 | 60/40 | 70/30 | 75/25 | 80/20 |
| $T_g$ (° C.) | 158 | 163 | 164 | 162 | 173 | 173 |
| $T_m$ (° C.) | 365 | 360 | 356 | 381 | 372 | 385 |
| RV (dL/g) | 1.18 | 4.20 | 4.35 | 1.07 | 4.85 | 1.55 |
| MV (kNs/m$^2$) | 0.18 | 1.85 | 1.89 | 2.04 | 8.75 | 4.41 |
|  | 6.84 | 8.82 | 8.88 | 6.71 | 9.08 | 7.23 |
| Inequality respected | Y | Y | Y | Y | Y | Y |
| G' (GPa) at 140° C. | 1.47 | 1.32 |  | 1.34 | 1.38 | 1.25 |
| G' (GPa) at 165° C. | 0.602 | 0.642 |  | 0.948 | 1.13 | 0.935 |
| G'(165° C.)/G'(140° C.) (%) | 41 | 49 | N/A | 71 | 82 | 75 |

TABLE 3

|  | Ex. A | Ex. B | Ex. C | Ex. D | Ex. E | Ex. F | Ex. H |
| --- | --- | --- | --- | --- | --- | --- | --- |
| PEDEK/PEEK or nature of polymer | PEK | PEKK-FC | KT-820P | 50/50 | 40/60 | 75/25 | PEKK-HT |
| $T_g$ (° C.) | 159 | 157 | 151 | 159 | 157 | 173 | 157 |
| $T_m$ (° C.) | 373 | 341 | 336 | 349 | 336 | 373 | 359 |
| RV (dL/g) |  |  | 1.07 | 1.25 | 1.35 | 3.13 | 0.93 |
| MV (kN/m$^2$) | 0.31 | 0.30 | 1.25 | 0.32 | 0.55 | >15 | 0.16 |
|  | n.d. | n.d. | n.d. | 6.92 | 7.03 | 8.32 | 6.52 |
| Inequality respected |  |  |  | Y | Y | N | Y |
| G' (GPa) at 140° C. | 2.19 | 1.67 | 1.51 | 1.21 | 1.12 | n.d. | 1.93 |
| G' (GPa) at 165° C. | 1.16 | 0.538 | 0.377 | 0.186 | 0.028 | n.d. | 0.732 |
| G'(165° C.)/G'(140° C.) (%) | 53 | 32 | 25 | 15 | 2.5 | n.d. | 38 |

Evaluation of Chemical Resistance of Compression Molded Samples

The 102 mm×102 mm×3.2 mm compression molded plaques of all the copolymers (PEDEK-PEEK) and PAEKs as detailed above were machined into Type V ASTM tensile specimens and these specimens were subjected to tensile testing according to ASTM method D638 at 0.05 inch/minute and at room temperature (i.e. 23° C.); results are the average of iterations on 3 specimens. Further, 3 Type V tensile bars of each polymer were exposed to a sweet salt water and hydrocarbon mixture in a 600 mL Inconel pressure vessel (154 mL heptanes+44 mL cyclohexane+22 mL toluene+36 mL aq 15 wt % KCl solution) at 300° C. for 7 days under nitrogen. At the end of this exposure time, the specimens were wiped and the weight after and before exposure were compared. Tables below summarize the weight gain, appearance of the bars and mechanical properties measured before and after exposure. EB is the elongation at break; $TS_y$ is the tensile strength at yield and $TS_b$ is the tensile strength at break; EY is the elongation at yield and TM is the tensile modulus. The retention of strength is calculated as follows:

$$\% \text{ retention strength} = 100 * \left( \frac{\text{strength at yield (or at break if no yield) after exposure}}{\text{strength at yield (or at break if no yield) before exposure}} \right).$$

TABLE 4

|  | Ex. 1 | Ex. 2 | Ex. 3 | Ex. 4 | Ex. 5 | Ex. 6 |
|---|---|---|---|---|---|---|
| PEDEK/PEEK | 60/40 | 60/40 | 60/40 | 70/30 | 75/25 | 80/20 |
| $T_g$ (° C.) | 158 | 163 | 164 | 162 | 173 | 173 |
| $T_m$ (° C.) | 365 | 360 | 356 | 381 | 372 | 385 |
| RV (dL/g) | 1.18 | 4.20 | 4.35 | 1.07 | 4.85 | 1.55 |
| MV (kN/m$^2$) | 0.18 | 1.85 | 1.89 | 2.04 | 8.75 | 4.41 |
| % crystallinity plaque | 34.0 | 24.9 | 20.5 | 42.0 | 28.4 | 35.8 |
| Before exposure | | | | | | |
| EB (%) | 4.5 | 2.7 | 67 | 2.0 | 34 | 19 |
| $TS_y$ (psi) | 13400 | — | 11800 | — | 12100 | 12100 |
| $TS_b$ (psi) | 13200 | 9070 | 11600 | 8650 | 12000 | 7000 |
| EY (%) | 4.3 | — | 4.8 | — | 6.2 | 5.3 |
| TM (kpsi) | 545 | 404 | 382 | 496 | 449 | 385 |
| After exposure | | | | | | |
| EB (%) | 1.5 | 2.0 | 9.9 | 1.5 | 20 | 1.0 |
| $TS_y$ (psi) | — | — | 9590 | — | 9880 | — |
| $TS_b$ (psi) | 7560 | 8460 | 7680 | 6880 | 9810 | 5280 |
| EY (%) | — | — | 3.0 | — | 21 | — |
| TM (kpsi) | 577 | 519 | 577 | 627 | 500 | 576 |
| % retention TS | 56 | 93 | 81 | 80 | 82 | 44 |
| % retention EB | 33 | 74 | 15 | 75 | 59 | 5 |
| % weight gain (wt %) | 6.7 | 7.1 | 7.1 | 5.2 | 7.3 | 6.0 |
| Appearance* | ○ | ○ | ○ | ○ | ○ | ○ |

Apparence:

○ = unchanged;

● = discoloured; and/or enbrittlened; and/or molten; and/or voids;

◐ some deformation.

TABLE 9

|  | Ex. A | Ex. B | Ex. C | Ex. D |
|---|---|---|---|---|
| PEDEK/PEEK or nature | PEK | PEKK-FC | KT-820P | 50/50 |
| $T_g$ (° C.) | 159 | 157 | 151 | 159 |
| $T_m$ (° C.) | 373 | 341 | 336 | 349 |
| RV (dL/g) |  |  |  | 1.25 |
| MV (kN/m$^2$) | 0.31 | 0.30 | 1.25 |  |
| % crystallinity plaque | 48.9 | 33.6 | 34.0 | 27.8 |
| Before exposure | | | | |
| EB (%) | 4.7 | 3.2 | 15 | 6.0 |
| $TS_y$ (psi) | — | — | 13700 | 9320 |
| $TS_b$ (psi) | 14300 | 17200 | 11800 | 8730 |
| EY (%) | — | — | 5.0 | 4.9 |
| TM (kpsi) | 633 | 648 | 540 | 456 |
| After exposure | | | | |
| EB (%) | 0.4 | 0.08 | 17 | 1.9 |
| $TS_y$ (psi) | — | — | — | — |
| $TS_b$ (psi) | 3280 | 434 | 10500 | 4610 |
| EY (%) | — | — | — | — |
| TM (kpsi) | 846 | 700 | 586 | 491 |
| % retention TS | 23 | 3 | 77 | 49 |
| % retention EB | 9 | 3 | 113 | 32 |
| % weight gain (wt %) | 1.2 | 3.8 | 8.3 | 8.3 |
| Appearance* | ○ | ● | ◐ | ○ |

*Apparence: ○ = unchanged; ● = discoloured; and/or enbrittlened; and/or molten; and/or voids; ◐ : some deformation.

TABLE 10

|  | Ex. E | Ex. F | Ex. G | Ex. H |
|---|---|---|---|---|
| PEDEK/PEEK or nature | 40/60 | 75/25 | 30/70 | PEKK-HT |
| $T_g$ (° C.) | 157 | 173 | 153 | 157 |
| $T_m$ (° C.) | 336 | 373 | 296 | 359 |
| RV (dL/g) | 1.35 | 3.13 | 0.93 |  |
| MV (kN/m²) |  | >15.0 | 0.16 | 0.93 |
| % crystallinity plaque | 26.1 | 28.0 | 24.4 | 40.0 |
| Before exposure | | | | |
| EB (%) | 39 | 29 | 12 | 2.0 |
| $TS_y$ (psi) | 11500 | 12100 | 12500 | — |
| $TS_b$ (psi) | 10900 | 11800 | 10400 | 11500 |
| EY (%) | 5.1 | 5.9 | 5.1 | — |
| TM (kpsi) | 450 | 470 | 169 | 643 |
| After exposure | | | | |
| EB (%) | 4.5 | 0.61 | N/A** | 0.26 |
| $TS_y$ (psi) | 5200 | — | N/A** | — |
| $TS_b$ (psi) | 4450 | 3150 | N/A** | 1810 |
| EY (%) | 4.3 | — | N/A** | — |
| TM (kpsi) | 455 | 562 | N/A** | 1070 |
| % retention TS | 45 | 26 | N/A** | 1.6 |
| % retention EB | 12 | 2 | N/A** | 13 |
| % weight gain (wt %) | 9.1 | 7.1 | N/A** | 1.7 |
| Appearance* | ● | ● | ● | ● |

*Apparence: ○ = unchanged; ● = discoloured; and/or enbrittlened; and/or molten; and/or voids; ◐ : some deformation; **N/A: determination after exposure were impossible as the specimen has completely molten.

The data shows that the copolymers (PEDEK-PEEK) of the invention present a better chemical resistance to the mixture simulating oil extraction muds and fluids than PEK or PEKK FC or HT, as shown by the higher retention of strength and of elongation at break. It also shows that copolymers with a ratio of PEDEK/PEEK units higher than 55/45 exhibit a better chemical resistance than the ones with a ratio of 50/50 or lower (Comp. Ex. D and E and G). The copolymers according to the invention possessing low amount of organic chlorine and possessing ordered structure and narrow molecular weight distribution (so as to comply with the MV vs RV parameters inequalilty mentioned above) exhibits a higher flow than the copolymers described in U.S. Pat. No. 4,766,197 and a better retention of properties after exposure to chemicals (see ex. 4 vs Comp. Ex. F).

Evaluation of Thermooxidative Stability of Compression Molded Samples 2 compression molded Type V tensile bars of each sample were exposed to air at 300° C. for 500 h and the tensile properties measured after exposure. Results are summarized in the Table below.

TABLE 5

|  | Ex. 1 | Comp. Ex A (PEK) | Comp. Ex. B (PEKK FC) |
|---|---|---|---|
| PEDEK/PEEK | 60/40 | | |
| Tg (° C.) | 158 | 159 | 157 |
| Tm (° C.) | 365 | 373 | 341 |
| MV (kN/m²) | 0.18 | 0.31 | 0.30 |
| Unexposed bars | | | |
| % crystallinity plaque | 34.0 | 48.9 | 31.4 |
| EB (%) | 4.5 | 6.7 | 3.2 |
| $TS_y$ (psi) | 13400 | 17044 | 17044 |
| $TS_b$ (psi) | 13200 | 16117 | 16 |
| EY (%) | 4.3 | 6.3 | — |
| TM (kpsi) | 545 | 648 | 648 |

TABLE 5-continued

|  | Ex. 1 | Comp. Ex A (PEK) | Comp. Ex. B (PEKK FC) |
|---|---|---|---|
| Exposed bars | | | |
| EB (%) | 5.2 | 5.4 | 3.4 |
| $TS_y$ (psi) | 14951 | — | — |
| $TS_b$ (psi) | 14900 | 17300 | 15800 |
| EY (%) | 5.4 | — | — |
| TM (kpsi) | 511 | 623 | 541 |
| % retention strength | 111 | 102 | 93 |
| % retention elongation at break | 121 | 80 | 106 |

The data shows that the copolymers (PEDEK-PEEK) of the invention maintain their mechanical properties after exposure to air.

Overall, the data shows that the copolymers (PEDEK-PEEK) present a higher thermal performance than PEEK or PEKK FC (higher G'(165° C.)/G'(140° C.) ratio) and a better chemical resistance in oil and gas applications than PEK or PEKK FC or HT, offering a unique combination of properties, solely when the molar ratio PEDEK/PEEK is higher than 55/45 and when the structure is sufficiently ordered and deprived of spurious end groups, as required in the claimed materials.

This unique combination of properties is particularly advantageous to the aim of using these materials for the manufacture of parts used in devices intended for Oil & gas exploration and extraction.

Should the disclosure of any patents, patent applications, and publications which are incorporated herein by reference conflict with the description of the present application to the extent that it may render a term unclear, the present description shall take precedence.

The invention claimed is:

1. A polyaryl ether ketone copolymer (PEDEK-PEEK) comprising:
recurring units ($R_{PEEK}$) of formula (I):

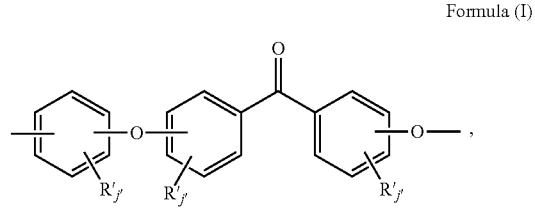

Formula (I)

and
recurring units ($R_{PEDEK}$) of formula (II):

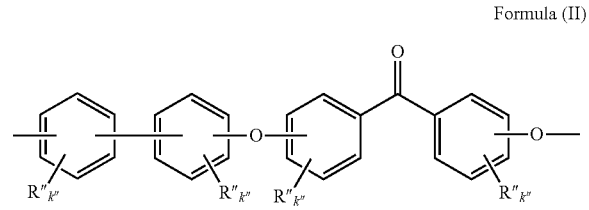

Formula (II)

wherein in above formulae (I) and (II), each of R' and R", equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of j' and k", equal to or different from each other, is independently selected at each occurrence from 0 and an integer of 1 to 4;

wherein the said recurring units are comprised in a molar ratio ($R_{PEEK}$):($R_{PEDEK}$) of 45:55 to 15:85, and wherein the said copolymer (PEDEK/PEEK):

(j) comprises an amount of chemically bound chlorine of less than 2.0 µeq/g, as determined by microcoulometry, and (jj) possesses a narrow molecular weight distribution such that the following inequality is satisfied:

$$MV\left(\frac{kN}{m^2}\right) \leq 6.62 \cdot \left[RV\left(\frac{dl}{g}\right)\right]^{0.20} \quad \text{Math. 15}$$

wherein:
MV is the melt viscosity measured pursuant to ASTM D3835 standard at 410° C. and at a shear rate of 46.3 sec$^{-1}$, using a conical die having a diameter of 1.016 mm a length of 20.32 mm and a cone angle of 120° C. and expressed in kNs/m$^2$; and RV is the reduced viscosity measured pursuant to ASTM D2857 standard at 25° C. on 1.0 wt/vol % solution in concentrated $H_2SO_4$ (96 wt %) and expressed in dl/g.

2. The polyaryl ether ketone copolymer (PEDEK/PEEK) of claim 1, wherein the molar ratio ($R_{PEEK}$):($R_{PEDEK}$) is 40:60 to 20:80.

3. The polyaryl ether ketone copolymer (PEDEK/PEEK) of claim 1 further comprising recurring units (RPAEK) different from recurring units (RPEEK) and (RPEDEK), wherein the amount of recurring units (RPAEK) is between 0 and 5% moles, with respect to the total number of moles of recurring units of copolymer (PEDEK/PEEK), and/or wherein said recurring units (RPAEK) comply with any of the following formulae (K-A) to (K-M) herein below:

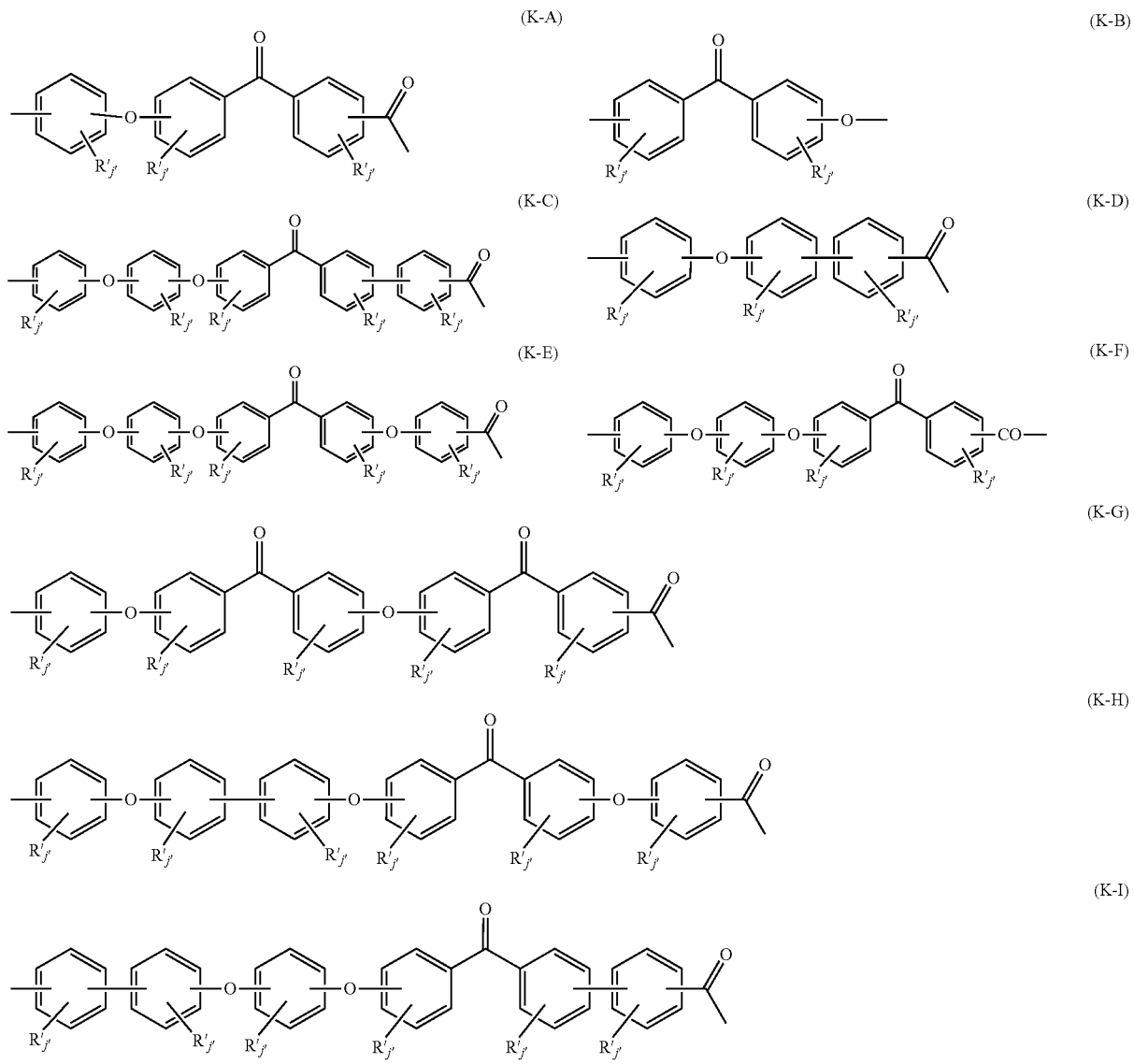

-continued

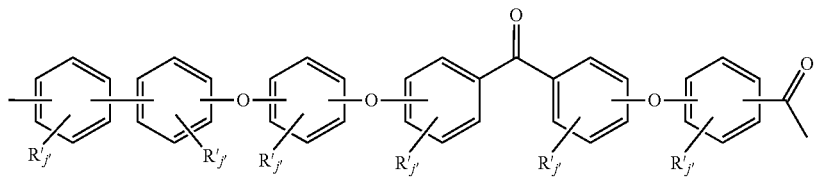
(K-J)

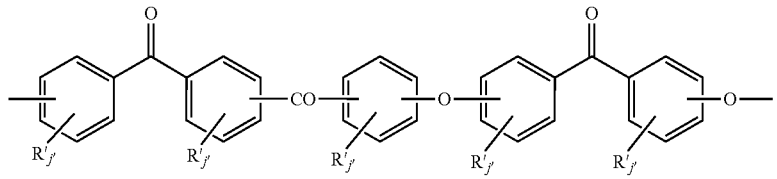
(K-K)

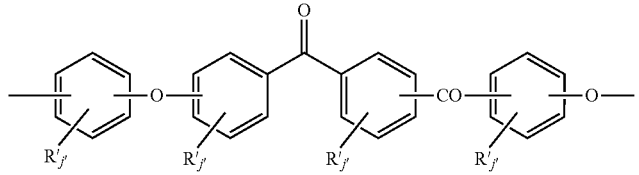
(K-L)

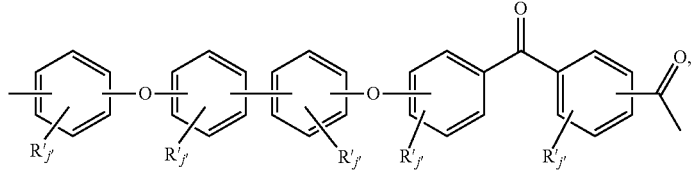
(K-M)

wherein in each of formulae (K-A) to (K-M), each of R', equal to or different from each other, is independently selected at each occurrence from a C1-C12 group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4.

4. The polyaryl ether ketone copolymer (PEDEK/PEEK) of claim 1, wherein in recurring units ($R_{PEEK}$) of formula (I), the connections among phenyl groups are in the para positions of each of the phenyl rings and/or each of j' is zero, and wherein recurring units ($R_{PEEK}$) comply with formula (Ia):

Formula (Ia)

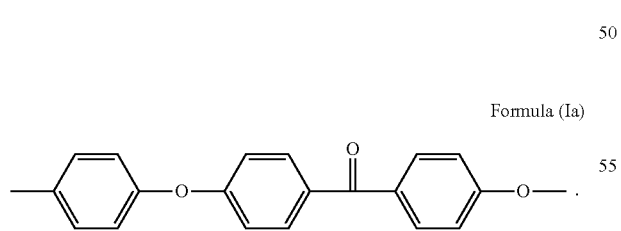

5. The polyaryl ether ketone copolymer (PEDEK/PEEK) of claim 1, wherein in recurring units ($R_{PEDEK}$) of formula (II), the connections among phenyl groups are generally in the para positions of each of the phenyl rings and/or each of k" is zero, and wherein recurring units ($R_{PEDEK}$) comply with formula (IIb):

Formula (IIb)

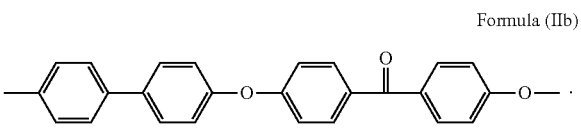

6. The polyaryl ether ketone copolymer (PEDEK/PEEK) of claim 1, wherein the copolymer comprises end groups selected from the group consisting of:

benzo-phenone fluoride groups of formula:

Formula (F)

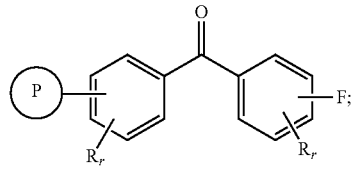

hydroxyl-containing groups of formula (OH-1) or (OH-2) or salified groups thereof:

Formula (OH-1)

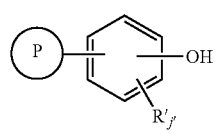

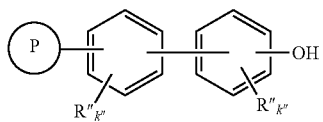
Formula (OH-2)

wherein the symbol

is intended to denote the polymer chain comprising recurring units ($R_{PEEK}$) and ($R_{PEDEK}$), wherein each of R, R' and R", equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of r, j' and k", equal to or different from each other, is independently selected at each occurrence from 0 and an integer of 1 to 4, and wherein end groups of formulae (F), (OH-1) and (OH-2) are more than 50% moles of the total moles of end groups of the copolymer (PEDEK/PEEK).

7. The polyaryl ether ketone copolymer (PEDEK/PEEK) of claim 1 comprising a narrow molecular weight distribution such that the following inequality is satisfied:

$$MV\left(\frac{kN}{m^2}\right) \leq 6.60\left[RV\left(\frac{dl}{g}\right)\right]^{0.20}, \quad \text{Math. 16}$$

wherein:
MV is the melt viscosity measured pursuant to ASTM D3835 standard at 410° C. and at a shear rate of 46.3 sec$^{-1}$, using a conical die having a diameter of 1.016 mm a length of 20.32 mm and a cone angle of 120° C. and expressed in kNs/m$^2$; and
RV is the reduced viscosity measured pursuant to ASTM D2857 standard at 25° C. on 1.0 wt/vol % solution in concentrated $H_2SO_4$ (96 wt %) and expressed in dl/g.

8. The polyaryl ether ketone copolymer (PEDEK/PEEK) of claim 1 comprising a narrow molecular weight distribution such that the following inequality is satisfied:

$$MV\left(\frac{kN}{m^2}\right) \leq 6.50\left[RV\left(\frac{dl}{g}\right)\right]^{0.20}. \quad \text{Math. 17}$$

9. The polyaryl ether ketone copolymer (PEDEK/PEEK) of claim 1 comprising a narrow molecular weight distribution such that the following inequality is satisfied:

$$MV\left(\frac{kN}{m^2}\right) \leq 6.40\left[RV\left(\frac{dl}{g}\right)\right]^{0.20}. \quad \text{Math. 18}$$

10. A method of making the polyaryl ether ketone copolymer (PEDEK/PEEK) according to claim 1, the method comprising reacting at least one difluoro-derivative of formula (III):

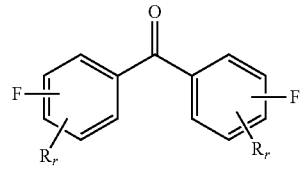
Formula (III)

with a mixture of di-hydroxyderivatives of formulae (IV) and (V):

Formula (IV)

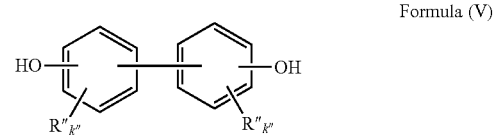
Formula (V)

in a molar ratio (IV):(V) of 45:55 to 15:85,
wherein in above formulae (III), (IV) and (V), each of R, R' and R", equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of r, j' and k", equal to or different from each other, is independently selected at each occurrence from 0 and an integer of 1 to 4,
in a polar organic solvent in the presence of a mixture of $Na_2CO_3$ and $K_2CO_3$, in a molar ratio Na/K of more than 45 mol/mol, and wherein the method optionally includes adding a step of adding a chlorinated compound of formula (VI):

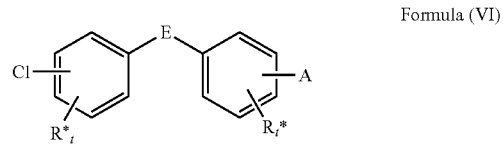
Formula (VI)

wherein -E- is a sulfone group of formula —$SO_2$— or a ketone group of formula —C(O)—, A is selected from Cl, F and H, each of R*, equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of t, equal to or different from each other, is independently selected at each occurrence from 0 and an integer of 1 to 4,
with the proviso that if said chlorinated compound of formula (VI) is added, its amount is of no more than 1% moles with respect to the total molar amount of monomers of formula (III), (IV) and (V).

11. The method of claim 10, wherein Na$_2$CO$_3$ and K$_2$CO$_3$ are used in an amount such that the ratio between the total amount in moles of said Na$_2$CO$_3$ and K$_2$CO$_3$ and the total amount in moles of hydroxyl-monomers of formulae (IV) and (V):

$$\frac{n_{Na_2CO_3} + n_{K_2CO_3}}{n_{(IV)} + n_{(V)}} \quad \text{Math. 19}$$

is at least 0.95 mol/mol.

12. The method of claim 10, wherein monomer (III) is 4,4'-difluorobenzophenone (DFBP), and/or wherein monomer (IV) is hydroquinone and/or wherein monomer (V) is 4,4'-dihydroxybiphenyl.

13. The method of claim 10, wherein monomers (III), (IV) and (V) are reacted in such an amount that the ratio between the molar amount of difluoro-monomer of formula (III) and the total molar amount of hydroxyl-monomers of formulae (IV) and (V):

$$\frac{n_{difluoro\text{-}monomer(III)}}{n_{hydroxy\text{-}monomer(IV)} + n_{hydroxyl\text{-}monomer(V)}} \quad \text{Math. 20}$$

is of at least 0.95 mol/mol.

14. A composition (C) comprising the polyaryl ether ketone copolymer (PEDEK/PEEK) of claim 1, at least one reinforcing filler and optionally one or more than one additional ingredient (I) different from the reinforcing filler and from the copolymer (PEDEK/PEEK), selected from the group consisting of (i) colorants, (ii) pigments, (iii) light stabilizers, UV stabilizers, (iv) heat stabilizers (v) antioxidants, (vi) acid scavengers (vii) processing aids, (viii) nucleating agents, (ix) internal lubricants and/or external lubricants, (x) flame retardants, (xi) smoke-suppressing agents, (x) anti-static agents, (xi) anti-blocking agents, (xii) conductivity additives, (xiii) plasticizers, (xiv) flow modifiers, (xv) extenders, (xvi) metal deactivators and combinations comprising one or more of the foregoing additives.

15. A shaped article comprising the polyaryl ether ketone copolymer (PEDEK/PEEK) of claim 1, the shaped article being a substantially bidimensional article.

16. An oil and gas recovery article comprising at least a part made from the polyaryl ether ketone copolymer (PEDEK/PEEK) of claim 1.

17. A method for recovering oil and/or gas including using at least one oil and gas recovery article according to claim 16.

* * * * *